(12) United States Patent
Latham et al.

(10) Patent No.: US 9,705,597 B2
(45) Date of Patent: Jul. 11, 2017

(54) MODULAR LIGHT BAR MESSAGING SYSTEM

(71) Applicant: Electronic Controls Company, Boise, ID (US)

(72) Inventors: Mark W. Latham, Boise, ID (US); William M. Cresse, Boise, ID (US); Kevin David Brewster, Somerset (AU)

(73) Assignee: Electronic Controls Company, Boise, ID (US)

( * ) Notice: Subject to any disclaimer, the term of this patent is extended or adjusted under 35 U.S.C. 154(b) by 0 days.

(21) Appl. No.: 15/236,273

(22) Filed: Aug. 12, 2016

(65) Prior Publication Data

US 2017/0085319 A1    Mar. 23, 2017

Related U.S. Application Data

(63) Continuation-in-part of application No. PCT/US2015/058659, filed on Nov. 2, 2015.

(60) Provisional application No. 62/250,493, filed on Nov. 3, 2015, provisional application No. 62/204,368, filed on Aug. 12, 2015.

(51) Int. Cl.
| | | |
|---|---|---|
| H04B 10/00 | (2013.01) | |
| H04B 10/116 | (2013.01) | |
| H04Q 11/00 | (2006.01) | |
| H04L 12/40 | (2006.01) | |
| H04J 14/00 | (2006.01) | |

(52) U.S. Cl.
CPC ............ *H04B 10/116* (2013.01); *H04L 12/40* (2013.01); *H04Q 11/0003* (2013.01); *H04L 2012/40215* (2013.01)

(58) Field of Classification Search
CPC ..................................................... H04B 10/116
See application file for complete search history.

(56) References Cited

U.S. PATENT DOCUMENTS

2014/0159890 A1*  6/2014  Piersing .................. B60Q 1/46
                                                                340/471

* cited by examiner

*Primary Examiner* — Daniel Dobson
(74) *Attorney, Agent, or Firm* — Stoel Rives LLP; Robert R. Teel

(57) ABSTRACT

Techniques for communicating lighting commands through a controller area network (CAN) bus of a light bar system include generating a light code message. The light code message has a metadata portion and a value portion. The metadata portion defines a purpose of value portion. The value portion controls a state of a lighting device (e.g., a keypad's LED brightness or activation of a directional light module) in the light bar system. A data field is generated by encapsulating the light code message with an ISO-TP single frame header and a message subtype. A CAN controller generates a CAN message having an extended frame format and the data field. The CAN message is then transmitted through the CAN bus.

25 Claims, 21 Drawing Sheets

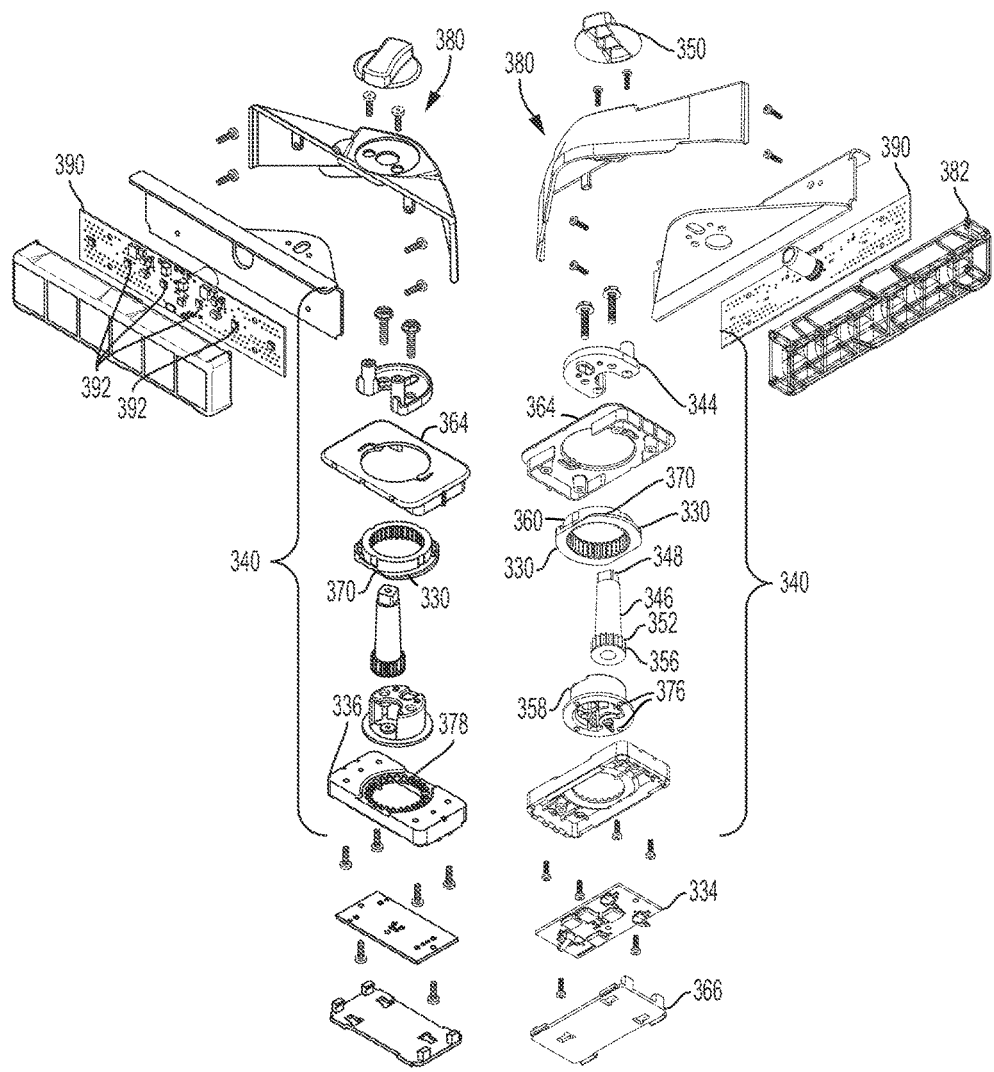

FIG. 18

MODULAR LIGHT BAR MESSAGING SYSTEM

RELATED APPLICATIONS

This application claims benefit of U.S. Provisional Patent Application No. 62/250,493, filed Nov. 3, 2015; and is a continuation-in-part of International Patent Application No. PCT/US2015/058659, filed Nov. 2, 2015; which claims benefit of U.S. Provisional Patent Application No. 62/204,368, filed Aug. 12, 2015. The '493, '659, and '368 applications are each incorporated herein by reference.

TECHNICAL FIELD

The present disclosure generally relates to a message protocol for vehicle-mountable light bars and, more particularly, to a controller area network (CAN) bus messaging platform for a light bar system.

BACKGROUND INFORMATION

A light bar secured onto a roof of an emergency or municipal vehicle provides a highly visible platform on which lighting devices are bolted, usually at discrete mounting points, and electrically signaled so as to produce warning light patterns for other vehicles and bystanders. Light bars are also used to carry lights that illuminate areas around the vehicle perimeter to improve lighting conditions for a first responder or other workers.

In operation, light bar lighting devices frequently feature flashing or rotating lighting components known to generate electromagnetic noise that interferes with other electronics and lighting signals. To mitigate the interference noise, previous lighting devices have received electrical power and control signals via dedicated wired connections. The wires, when routed through an internal compartment of a light bar, lessen effects of electromagnetic noise on the operation of sensitive telecommunications equipment inside the vehicle. But as the number of lights in a light bar increases, so does the number of wires routed from lighting equipment to a vehicle's master controller unit and junction box, which may be located in the trunk, in the engine compartment, under a seat within the passenger interior area of the vehicle, or on an interior surface of the roof.

The previous hard-wired, discrete mounting point installation techniques are labor-intensive to install, have bolt patterns and wire connections that do not provide interoperability with lighting devices available from various manufacturers, and do not provide for user-configurable lighting arrangements. For example, replacing a lighting device of a previous light bar entails opening a transparent protective shell by unscrewing or unclipping its fasteners, disconnecting power and signal wires from the lighting device, unfastening the lighting device from the light bar, replacing it with a lighting device having a compatible bolt pattern and wire connectors (often having a proprietary connector type available from a specific vendor), testing the newly installed lighting device, refastening the transparent protective shell, and repeating the process to the extent changes are necessary. Furthermore, due to the use of tools involved during this process, lighting configuration changes typically entail temporarily taking a vehicle out of service.

SUMMARY OF THE DISCLOSURE

Communicating lighting commands through a controller area network (CAN) bus of a light bar system entails generating a light code message including metadata portion and a light-control portion, a value of the metadata portion defining a purpose of content of the light-control portion; including the light code message as a data packet in a CAN message, the CAN message having an extended frame format and including a 64-bit data field, the 64-bit data field including an ISO-TP single frame header, a message subtype, and the light code message; and transmitting the CAN message through the CAN bus.

Additional aspects and advantages will be apparent from the following detailed description of embodiments, which proceeds with reference to the accompanying drawings.

BRIEF DESCRIPTION OF THE DRAWINGS

FIGS. 7 and 8 are respective exploded isometric bottom and top views of a directional light module of FIGS. 1 and 2, showing details of diode bridge electrical circuitry and a planetary gear assembly that collectively facilitate deployment of the track-mounting foot within a mounting track according to different electrical contact positions while providing for rotation of a substantially rectangular optic array toward user-selectable directions.

FIG. 18 is a pair of an annotated block diagrams of a non-ULC messages in a CAN message, according to one embodiment.

DETAILED DESCRIPTION OF EMBODIMENTS

Section 1: Introduction

This section provides an overview of light bar microcontroller firmware and drivers that control a vehicle light bar system based on command messages responsive to user- or vehicle-generated input signals. Initially, however, the following subsection provides an overview of modular light bar systems.

1.0 Light Bar Systems

Vehicles are typically configured for either left- or right-side driving. This disclosure, therefore, avoids describing light bar features in terms of driver and passenger sides, and instead uses industry standard terms of left (port), right (starboard), head (front), and tail (rear, or back) sides as determined from the perspective of a person sitting in a vehicle and looking through a front windshield.

Figure 1:
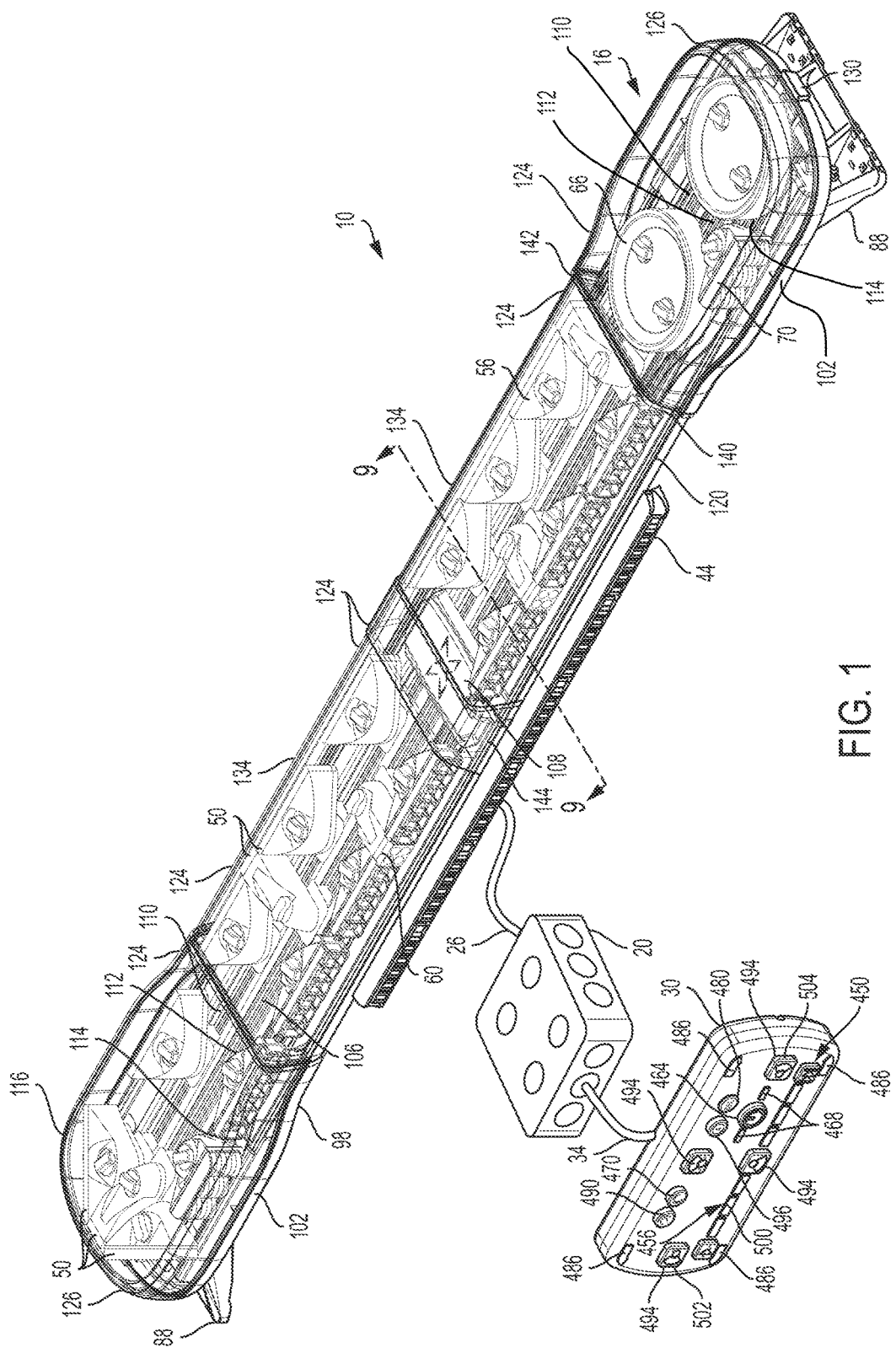
FIG. 1 is an isometric top view of a vehicle track-lighting system including a vehicle-mountable track-lighting light bar, multiple light modules supported on a mounting platform in a user-configurable mounting position, a rearward facing safety director, and a junction box and a keypad user interface configured for placement inside the vehicle passenger compartment.

FIG. 1 shows an overview of a vehicle track-lighting system 10 in an assembled condition, configured for deployment atop a roof of a vehicle (not shown). Vehicle track-lighting system 10 includes a vehicle-mountable track-lighting light bar 16, an electrical connection junction box (JBox) 20 providing connections to light bar 16 through a first wired connection 26 for conveying electrical power and providing a CAN bus data communication channel, a keypad user interface 30 (shown enlarged) connected to electrical connection junction box 20 through a second wired connection (cable) 34 for conveying electrical power and providing a second CAN bus interface, an external safety director 44, and several light modules 50.

Figure 13:
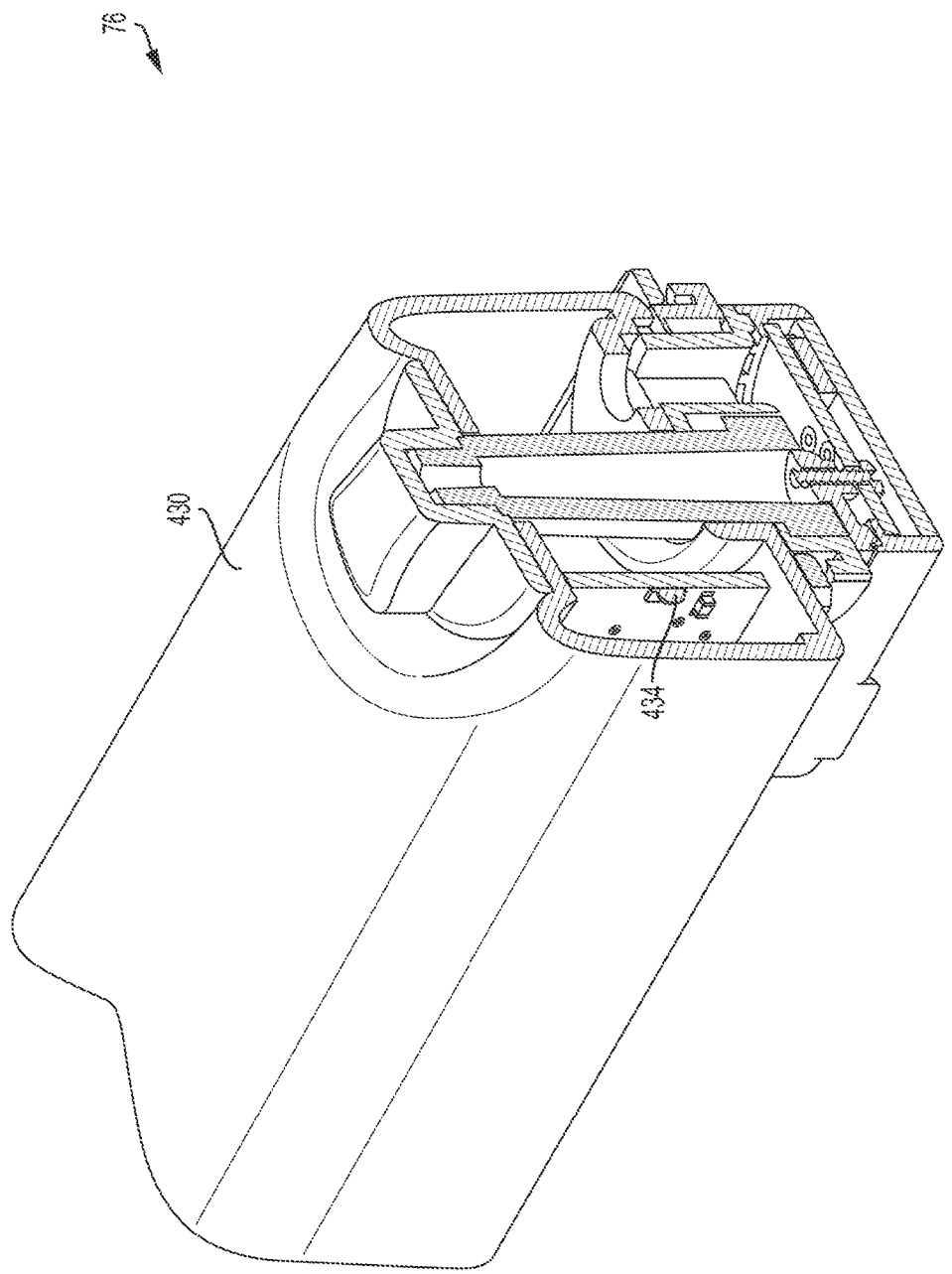
FIG. 13 is a fragmentary isometric cross-sectional view of a left side of a forward illuminated, middle-track light module that has a light dispersing cover and is mountable within a middle mounting track of the light bars of FIGS. 1 and 3.

Light modules 50 include five types of specialized lighting devices, such as, for example, a directional light module 56, a task light module 60, a beacon light module 66, an STI light module 70, and a middle-track light module 76 (FIG. 13). With the exception of STI light module 70, each one of light modules 50 includes a track-mounting foot of a common design such that a track-mounting foot, in cooperation with light bar 16, provides for user-selectable electrical contact positions at releasable mounting locations along mounting tracks of light bar 16. Details of these features are described at length in later paragraphs of this detailed description. Initially, however, the following two paragraphs set forth introductory overviews of, respectively, light bar 16 and four types of light modules being mounted in user-configurable mounting positions along selected mounting tracks.

Light bar 16 has a contoured exterior shape generally defined by the following three light bar components—described in order from bottom to top components. First, a pair of rooftop-mounting feet 88 are spaced apart at lateral ends of light bar 16 to establish a low profile height for reduced aerodynamic drag. Second, a chassis 98 includes plastic U-shaped end caps 102 and an aluminum light-module mounting platform 106 for supporting mounted light modules 50, associated circuitry, and a centrally mounted light bar controller housing 108. Light-module mounting platform 106 has three mounting tracks, including a front mounting track 110 (located closest to a vehicle windshield when light bar 16 is mounted atop the roof), a middle mounting track 112, and a rear mounting track 114 (to be located closest to a vehicle's tail lights). Third, a segmentable protective cover 116, which is also supported by chassis 98 (i.e., in a groove 120 running along a periphery of chassis 98), is transparent for passing light emitted from light modules 50 and includes multiple shaped cover segments 124. End segments 126 of multiple shaped cover segments 124 are each releasable from chassis 98 by rotatably releasing associated latches 130 and lifting end segments 126 out of groove 120 and away from plastic U-shaped end caps 102. Central segments 134, which are narrower in width than rooftop-mounting feet 88 or end segments 126, have free ends 140 encompassed by baffles 142 of end segments 126 (and of a bridge segment 144) when segmentable protective cover 116 is assembled. Baffles 142 also assist in blocking water intrusion. After end segments 126 are separated from free ends 140, however, free ends 140 may also be readily lifted away from groove 120.

Figure 2:
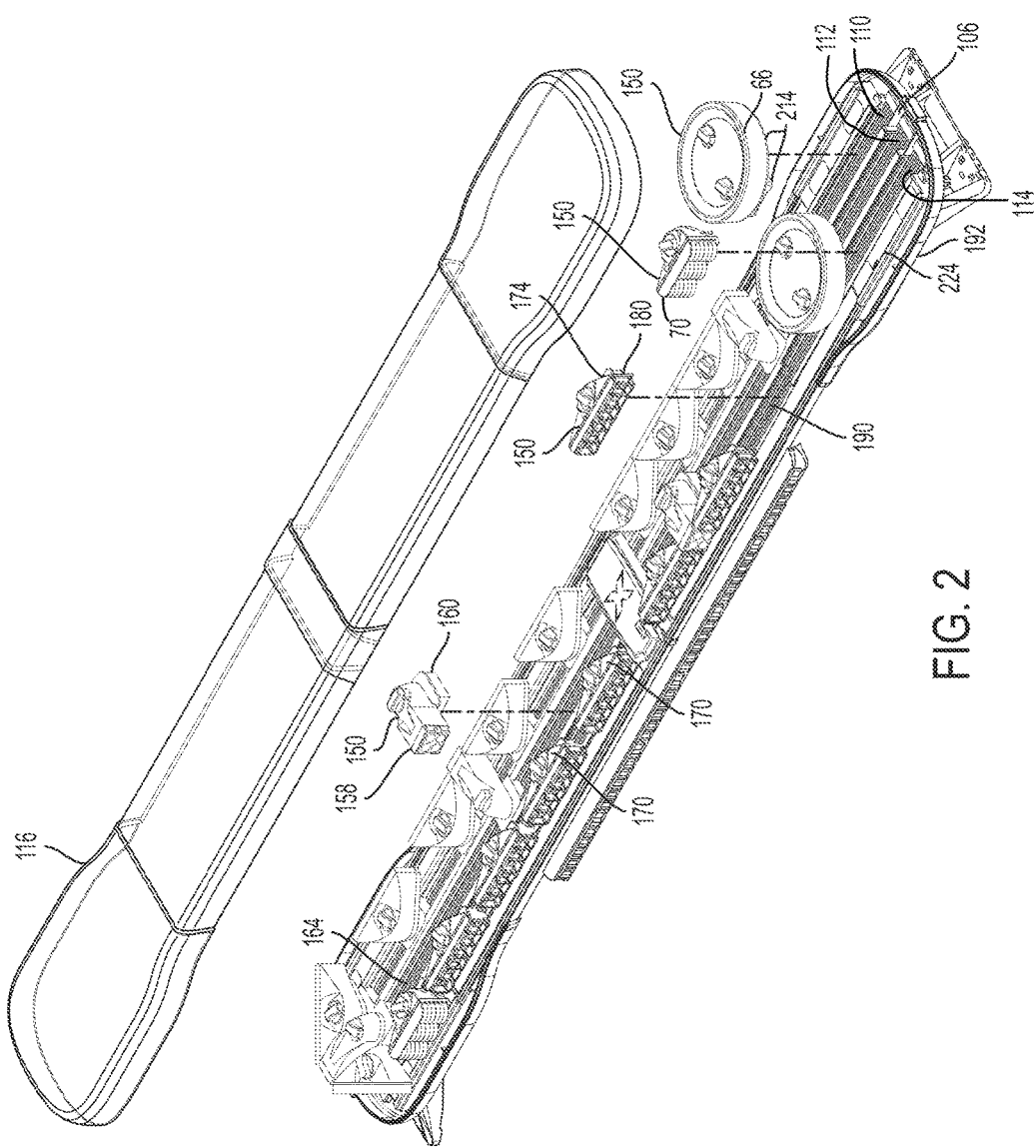
FIG. 2 is a partly exploded isometric top view of the vehicle-mountable track-lighting light bar of FIG. 1, showing a transparent and segmentable protective light cover that is decoupled from the light bar chassis, and a set of directional, task, beacon, and stop-tail-indicator (STI)—also called a stop-tail-turn (STT) in the U.S.—light modules released from their respective track mounting positions on the mounting platform.

FIG. 2 shows segmentable protective cover 116 (as assembled) lifted upward and away from light-module mounting platform 106 for positioning four light modules 150 at user-selected locations along light-module mounting platform 106. The locations shown depict one of countless arrangements. In the example shown here, a rear-facing, left-side task light module 158 includes a rectangular track-mounting foot 160 that is rotatably oriented and disposed above a left-side portion 164 of middle mounting track 112 for mounting rear-facing, left-side task light module 158 at a location between adjacent, rear-facing, left-side directional light modules 170. Similarly, a rear-facing, right-side directional light module 174 includes a rectangular track-mounting foot 180 (having an identical design to that of rectangular track-mounting foot 160) that is rotatably oriented and disposed above a right-side portion 190 of rear mounting track 114 for mounting rear-facing, right-side directional light module 174 at a location near a right-side end cap 192 of plastic U-shaped end caps 102. Also on the right side is beacon light module 66 that includes two track-mounting feet 214, of which at least one includes electrical circuitry for electrical association with a selected front or rear track, e.g., right-side portion 190 of rear mounting track 114. Finally, STI light module 70 is shown above right-side end cap 192 so as to engage a standard STI electrical receptacle 224 that has electrical connection members for conveying electrical power, taillight, and lighting signals in response to a vehicle stopping or indicating a turn.

Figure 3:
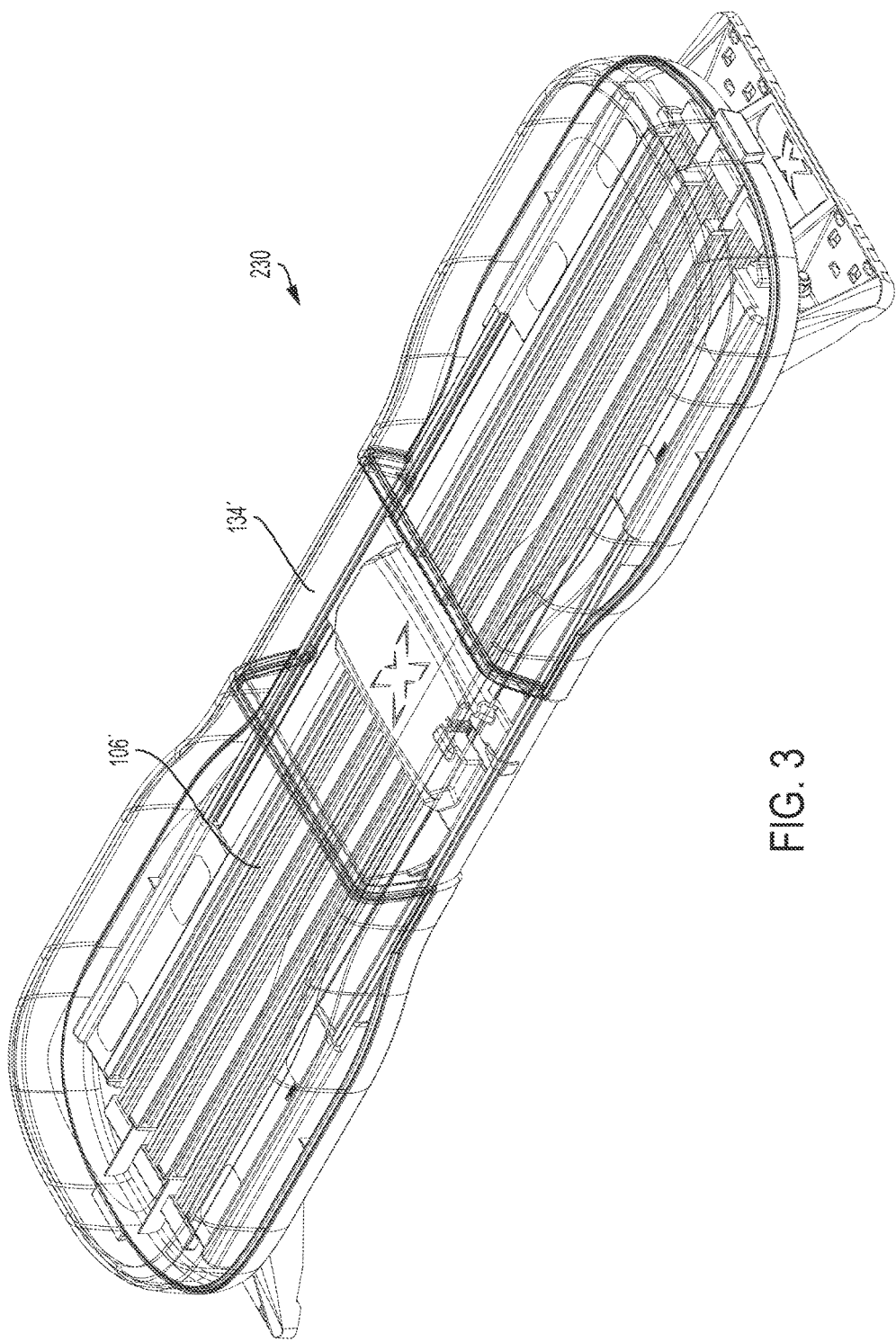
FIG. 3 is an isometric top view of a vehicle-mountable track-lighting light bar according to another embodiment having a shorter chassis length and fewer protective shell segments than those of the light bar of FIG. 1.
Figure 4:
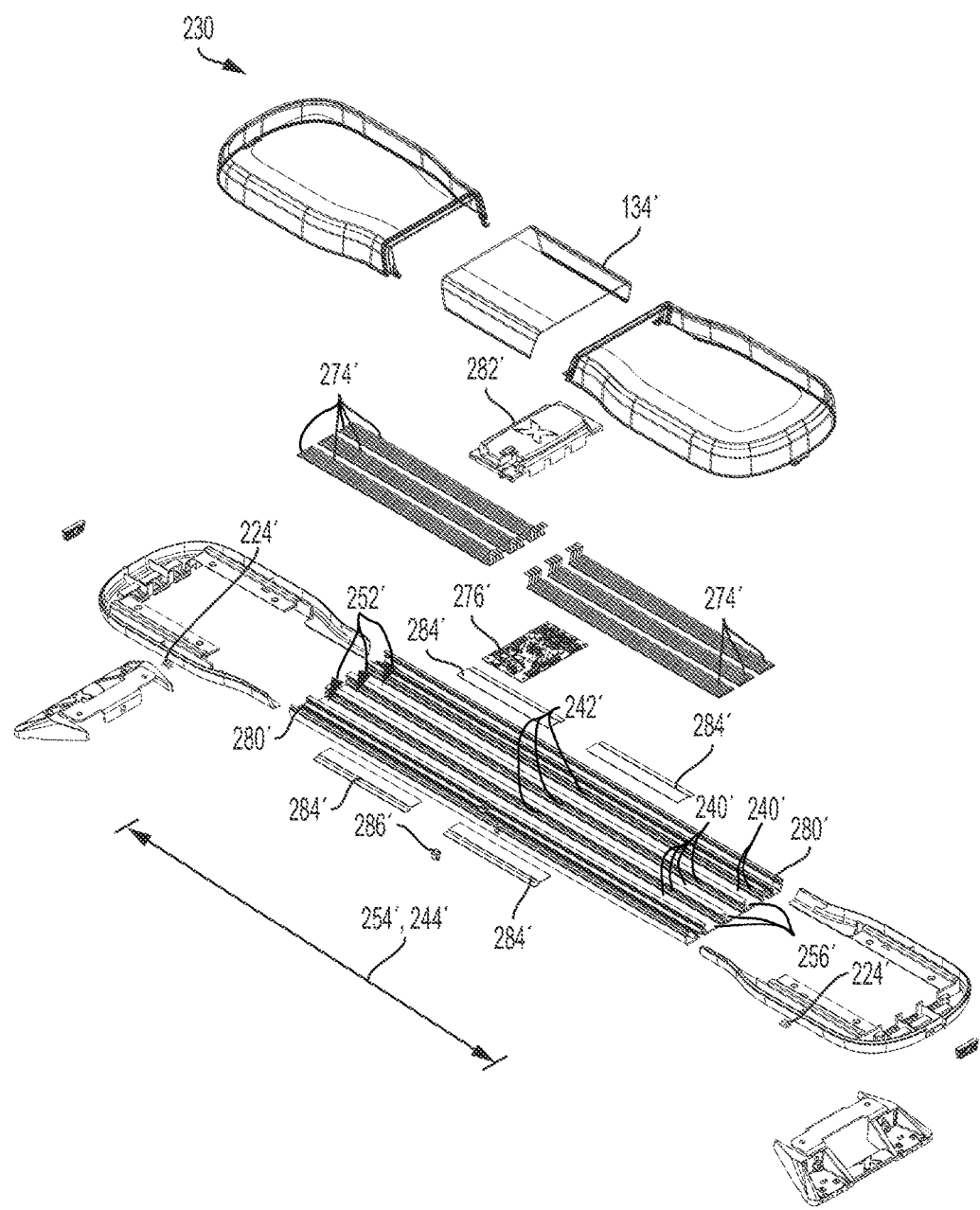
FIG. 4 is an exploded isometric top view of the light bar of FIG. 3.
Figure 5:
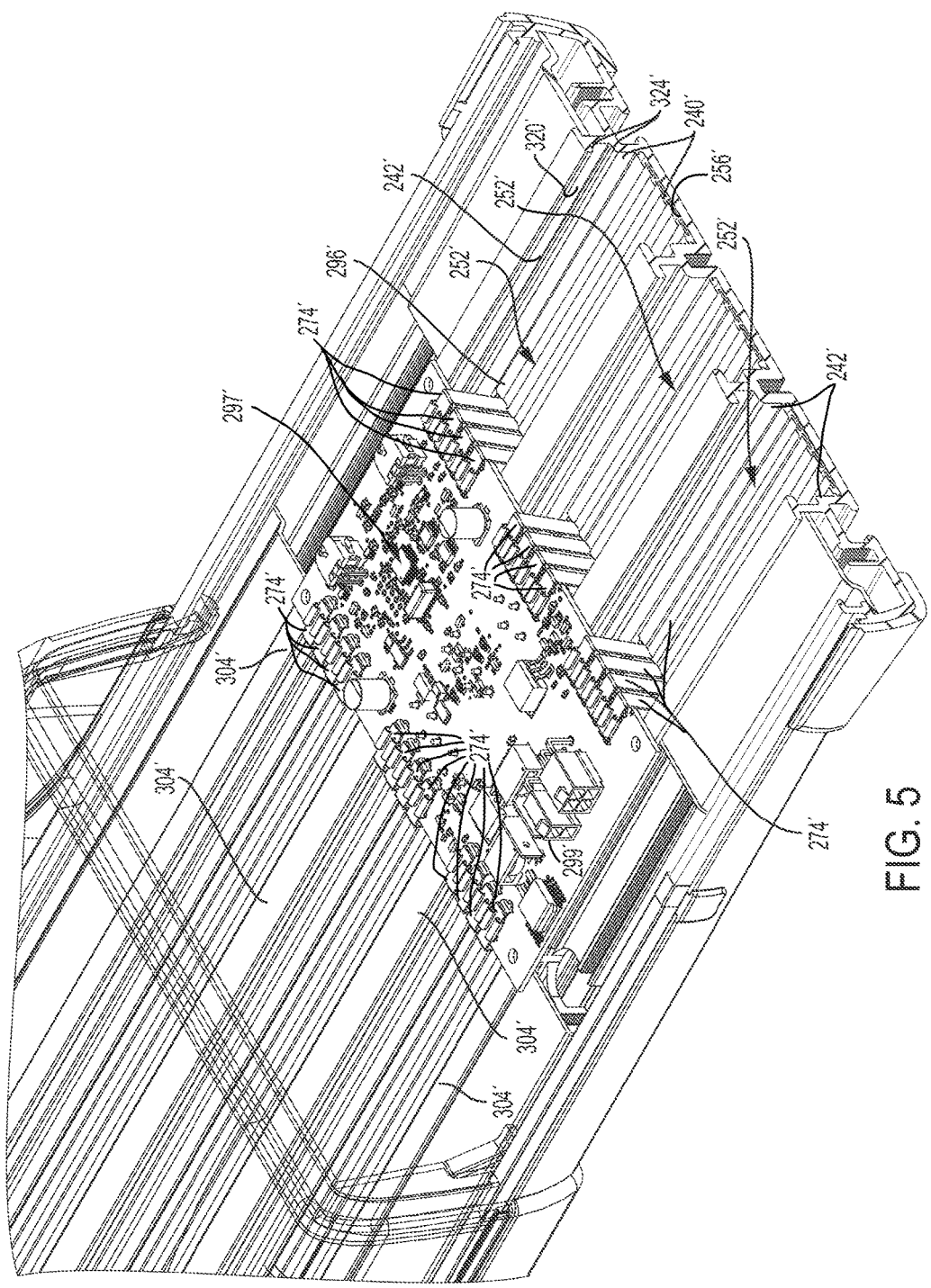
FIG. 5 is an enlarged fragmentary isometric top view of a central portion of the light bar of FIG. 3, shown with its controller housing cover and its central and right-side protective light cover segments removed so as to depict details of controller electrical circuitry and electrically conductive pathways running along left- and right-side mounting-track floor surfaces of front, rear, and middle mounting tracks.

FIGS. 3-5 show a shorter version of a vehicle-mountable track-lighting light bar 230 having many parts (i.e., components and features) that are the same as or similar to those of light bar 16. Because the two versions have identical or similar parts, identical reference numbers identify common parts, and reference numbers denoted with prime symbols specifically refer to corresponding parts shown in FIGS. 3-5. Unlike the version shown in FIGS. 1 and 2, however, vehicle-mountable track-lighting light bar 230 includes one central segment 134', has a shorter light-module mounting platform 106', and is shown without any mounted light modules so that details of its light-module mounting platform 106' are more clearly visible and not obscured by light modules.

FIG. 4 shows that light-module mounting platform 106' includes multiple laterally spaced-apart, rigid track walls 240' having side walls 242' and a side wall length 244', with different adjacent pairs of rigid track walls 240' defining light module mounting tracks 252'. Each of light module mounting tracks 252' has a track length 254' and a track floor 256' for supporting multiple laterally spaced-apart electrically conductive pathways 274' (i.e., rails) that carry electrical signals produced by a controller board assembly 276' (also called a driver board). Peripheral channels 280' stow wiring (e.g., for connecting standard STI electrical receptacles 224'). A controller cover 282' protects controller board assembly 276', and plastic covers 284' protect stowed wiring. A removable plug 286' plugs a wiring gap when safety director 44 (FIG. 1) is not installed.

FIG. 5 shows that electrically conductive pathways 274' are electrically isolated from light-module mounting platform 106' by insulating strips 296', which also isolate adjacent electrically conductive pathways 274' from each other. Accordingly, when a track-mounting foot 160 (FIG. 6) is set in one of light module mounting tracks 252', its leaf-spring electrical contact members 300 (FIG. 6) contact associated ones (i.e., three of four) of the electrically conductive pathways 274' such that track-mounting foot 160 maintains contact while it is slid lengthwise along track length 254' to a user-selected location.

Controller board assembly 276' includes a processor (and associated electrical circuitry, including EEPROM nonvolatile memory) 297' operatively coupled to a CAN bus 298 (FIG. 15) through a CAN bus connector 299'. Processor 297' receives (or transmits) CAN bus signals through an internal or external CAN controller communicatively coupled to bus connector 299'. Accordingly, the signals are interpreted (or generated) by a CAN controller, which may be internal to or separate from processor 297'. According to one embodiment, processor 297' is a 32-bit ARM microcontroller unit (MCU), part no. LPC11C14, available from NXP Semiconductors N.V. of Eindhoven, Netherlands. This type of processor includes, among other things, up to 32 kB of flash memory, 8 kB of data memory, one C_CAN controller, one Fast-mode Plus I²C-bus interface, one RS-485/EIA-485 UART, two SPI interfaces with SSP features, four general purpose counter/timers, a 10-bit ADC, and up to 40 general purpose I/O pins. Other CAN nodes in the system may include the same or similar type of MCU.

The CAN bus signals, when processed through the physical-layer interface of the CAN controller, provide information in the form of a CAN message that is provided to processor 297' for high-layer data processing. For example, processor 297' interprets information from a CAN message and, depending on the information, causes controller board assembly 276', which is electrically associated with electrically conductive pathways 274', to apply electrical signals for delivery to leaf-spring electrical contact members 300 and thereby activate a lighting component of the light module. Additional details of electrically conductive pathways 274 are described with reference to FIG. 14 in latter paragraphs of this disclosure.

Figure 6:
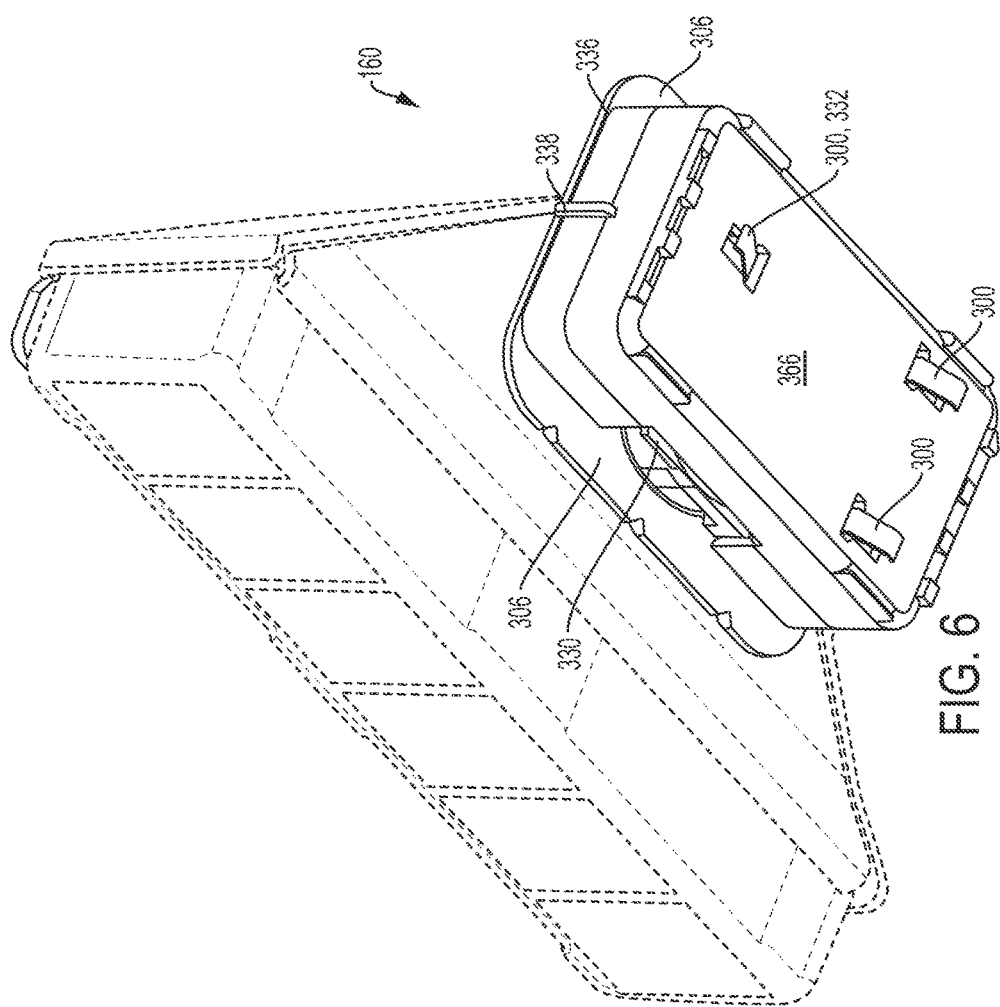
FIG. 6 is an isometric bottom view of a track-mounting foot of a light module of FIGS. 1 and 2, showing three leaf-spring electrical contacts extending from a bottom surface of the track-mounting foot for contacting electrically conductive pathways extending along a mounting-track floor surface of a mounting track.

FIGS. 5 and 6 also show structural features providing for releasable positioning of light modules. For example, FIG. 5 shows that bearing surfaces 304' atop track walls 240' extend in a plane parallel to floor 256'. Bearing surfaces 304' contact flanges 306 (FIG. 6) of track-mounting foot 160 for supporting a light module as it is slid in its associated light module mounting track 252'. Also, FIG. 5 shows slots 320', formed between spaced-apart ridges 324' in side walls 242' of confronting ones of track walls 240', run along length 244' of side walls 242'. Confronting slots 320' are spatially aligned and have substantially the same width and depth to receive laterally extending track-attachment members 330 (shown retracted in FIG. 6, extended in FIG. 9) of a light module having its track-mounting foot 160 set in light module mounting track 252'.

A middle leaf-spring electrical contact member 332 (FIG. 6) is slightly off center so as to engage one of two middle electrically conductive pathways 274' (depending on the rotational position of track-mounting foot 160). And because track-mounting foot 160 is rotatable by 180 degrees (e.g., for use in front or back mounting tracks), a small circuit board 334 (FIG. 7) within a track-mounting foot housing 336 includes whetstone bridge electrical circuitry for reversing polarity of power and ground carried on a pair of outer electrically conductive pathways.

By rotating track-mounting foot housing 336, middle leaf-spring electrical contact member 332 is capable of selectively contacting one of the two middle electrically conductive pathways 274' and thereby receiving a selected electrical signal according to the rotational position. For example, a first contact position is used to engage a power electrically conductive pathway providing an uninterrupted source of power, a ground electrically conductive pathway, and a first signal electrically conductive pathway; whereas a second contact position is used to engage ground electrically conductive pathway, power electrically conductive pathway, and a second signal electrically conductive pathway. Thus, the first signal electrically conductive pathway may carry a first sequence of lighting control signals activating a first group of light modules (e.g., light modules producing light that is red in color), whereas the second signal electrically conductive pathway may carry a second sequence of lighting control signals activating a second group of light modules (e.g., light modules producing light that is blue in color) that are different from the first group of light modules. This design approach avoids the use of numerous signal wires routed to each light module, and provides for rapid reconfiguration without the use of tools. A small exterior tab 338 indicates for a user the side of track-mounting foot 160 that is closest to middle leaf-spring electrical contact member 332 so that a user can readily determine its rotational position even after track-mounting foot 160 is installed in a track.

It should be understood that other techniques for repositioning middle leaf-spring electrical contact member 332 are possible and within the scope of this disclosure. For example, a middle leaf-spring electrical contact member may be independently moveable by sliding or (re-)plugging it into various contact positions. In other words, other means of (lateral) displacement of a contact member, relative to its associated contact members, are possible. In another embodiment, contact members may be selectively (de)activated using, for example, switching devices, in which case a subset of active contact members would carry electrical signals of selected rails.

FIGS. 7 and 8 show a planetary gear system 340 that provides for rotatable adjustment of track-mounting feet, and for arresting rotation upon deployment of laterally extending track-attachment members 330 into slots 320 (FIG. 5). Planetary gear system 340 includes a driveshaft brace 344 that confronts and stabilizes a driveshaft 346. Driveshaft 346 receives at its drive end 348 a user-graspable twist knob 350 and at its driven end 352 has a sun gear 356. Sun gear 356 is braced by a gear brace 358 that maintains contact between the teeth of sun gear 356 and those of an orbital, annular gear 360. Annular gear 360 has on its circumferential side wall a pair of laterally extending track-attachment members 330 that extend and retract as driveshaft 346 is rotated about its longitudinal axis of rotation normal to a bottom surface 366 (FIGS. 6 and 7) of track-mounting foot 160. A cover plate 364, having a central aperture, receives annular gear 360.

Figure 9:
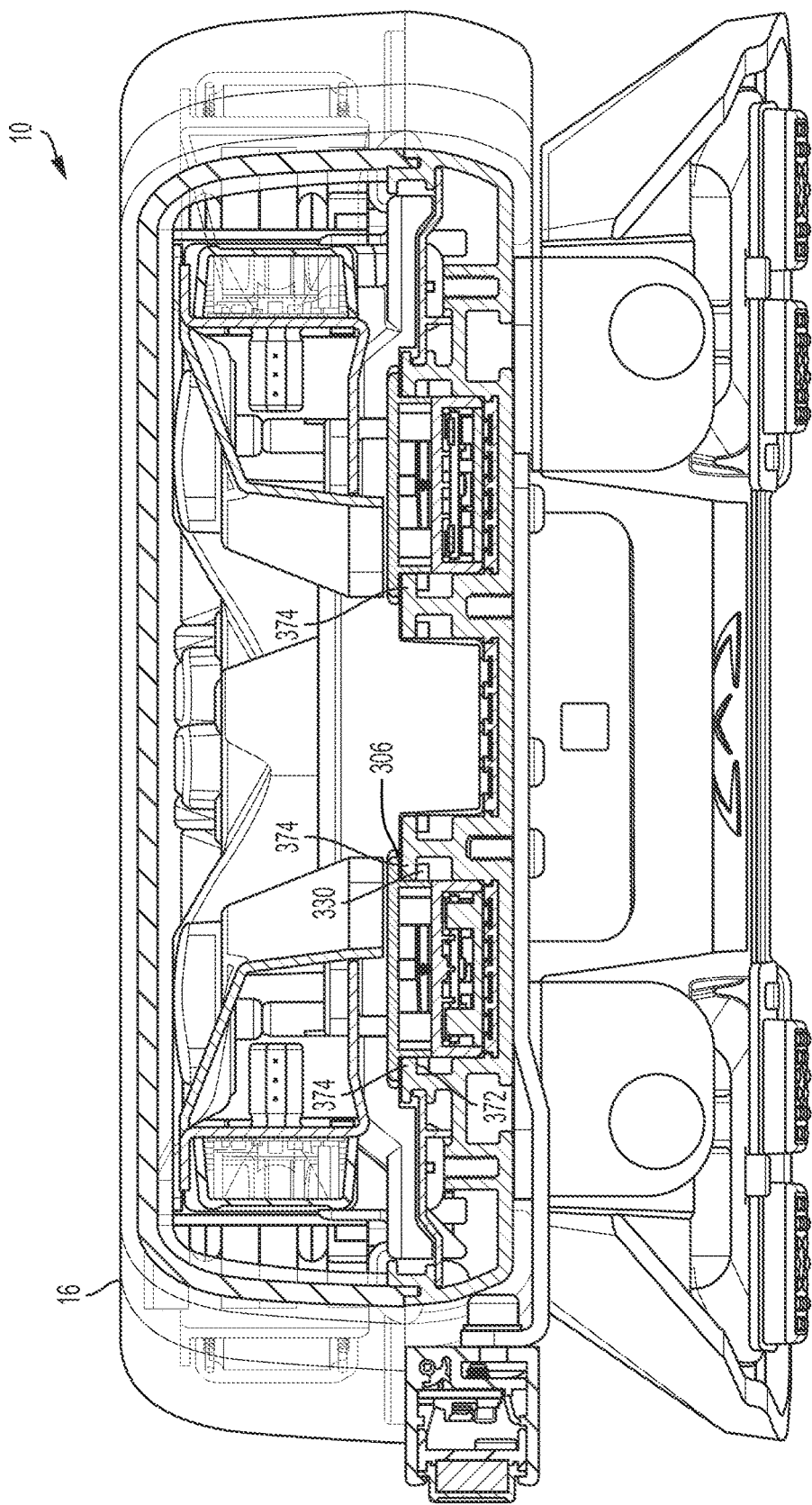
FIG. 9 is a section view taken along line 9-9 of FIG. 1, showing a front-facing directional light module set in a front mounting track according to a first electrical contact position, and a rear-facing directional light module set in a rear mounting track according to a second electrical contact position in which the track-mounting foot of the rear-facing directional light module is rotated 180 degrees about an axis of a driveshaft of the planetary gear assembly.

FIGS. 7-9 show how ramped surfaces 370 (FIG. 7) of laterally extending track-attachment members 330 engage slots 320' (FIG. 5) to releasably secure track-mounting feet 160 within an associated track. Specifically, laterally extending track-attachment members 330 act as a cam rotatable about the longitudinal axis defined by user-twistable driveshaft 346 so that cam lobes (i.e., ramped surfaces 370) slide against an upper interior slot surface 372 (FIG. 9) and cause the lobes to take up increasing amounts of width of slots 320. As the lobes take up space, upper ridges 374 of slots 320 are pinched between flanges 306 and track-attachment members 330. Concurrently, ramped surfaces 370 force detents 376 (FIG. 7) that are located on a bottom face of gear brace 358 into corresponding grooves 378 (FIG. 8) that are mutually angularly spaced apart in 15-degree increments about a circumference of a circular wiring aperture in track-mounting foot housing 336. When they are forced into corresponding grooves 378 by the pinching of upper ridges 374, detents 376 prevent further rotation between a light housing 380 and track-mounting foot 160 because detents 376 of gear brace 358 are fastened to light housing 380, and grooves 378 are affixed to track-mounting foot 160. When detents 376 are free from (i.e., do not engage) grooves 378, however, directional optic 382 is readily rotatable about the longitudinal axis of drive shaft 346 to provide illumination in selectable directions.

FIGS. 7 and 8 also show a circuit board 390 of directional light module 56 that drives multiple light emitting diode (LED) 392 lighting components in response to a pulse width modulated (PWM) lighting control signal receiving from a signal rail. PWM lighting control signals are used for rapidly power cycling LEDs 392 so as to adjust brightness and mitigate heat buildup from LEDs 392. For example, when a light bar is configured for providing steady illumination (i.e., no flashing), a rapid 50% duty cycle (or less) may be used to appear as flicker-free illumination. This rapid power cycling reduces heat buildup within the internal compartment of the light bar 16 and decreases brightness. Other duty cycles may be used to further reduce brightness. A low brightness, nighttime operational mode is established at a duty cycle of about 40%, according to some embodiments.

Figure 10:
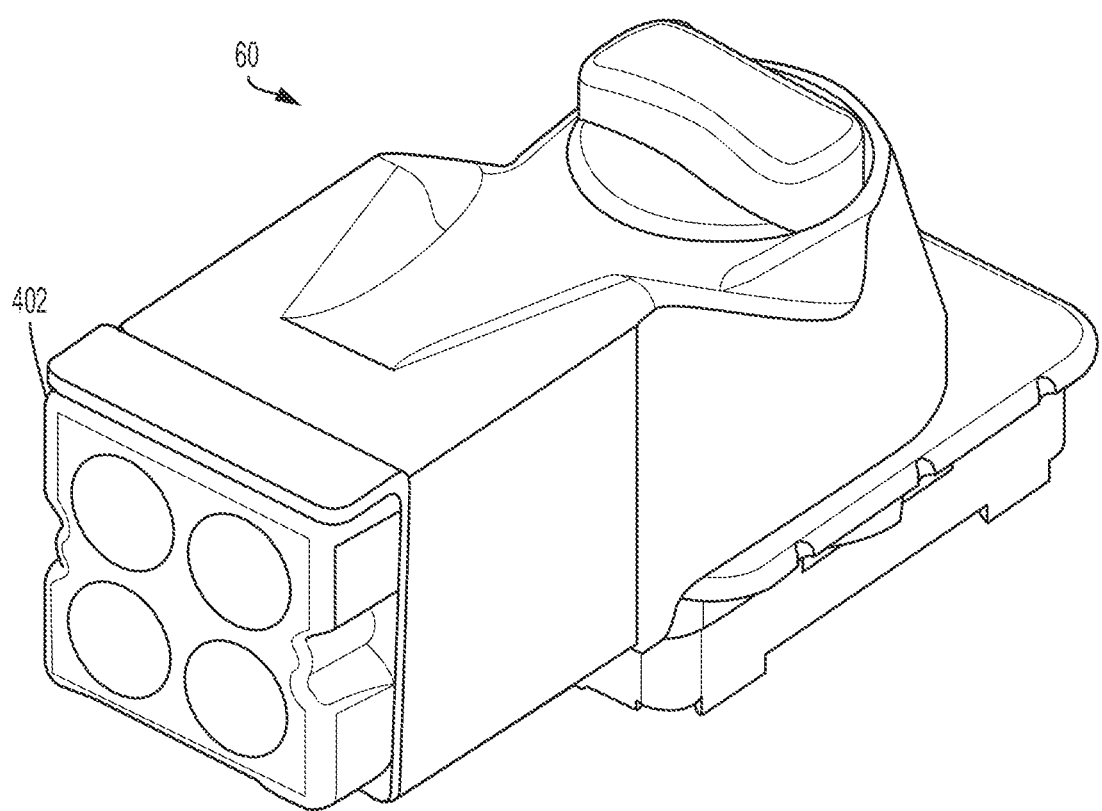
FIG. 10 is an isometric top view of a task light mountable within a middle mounting track in front-, side-, or rear-facing positions to provide, respectively, takedown, alley (side street), or worklight illumination.

FIG. 10 shows a task light module 60 that is similar to directional light module 56 in that it receives power, ground, and signals as described previously. Its associated signal rail may be automatically controlled as part of a flashing pattern produced by controller board assembly 276, or manually controlled as work light, alley, or takedown illumination as desired. Illumination produced by task light module 60 is highly focused due to a substantially square optic 402, which is capable of producing a highly focused beam of light toward a user-selected direction.

Figure 11:
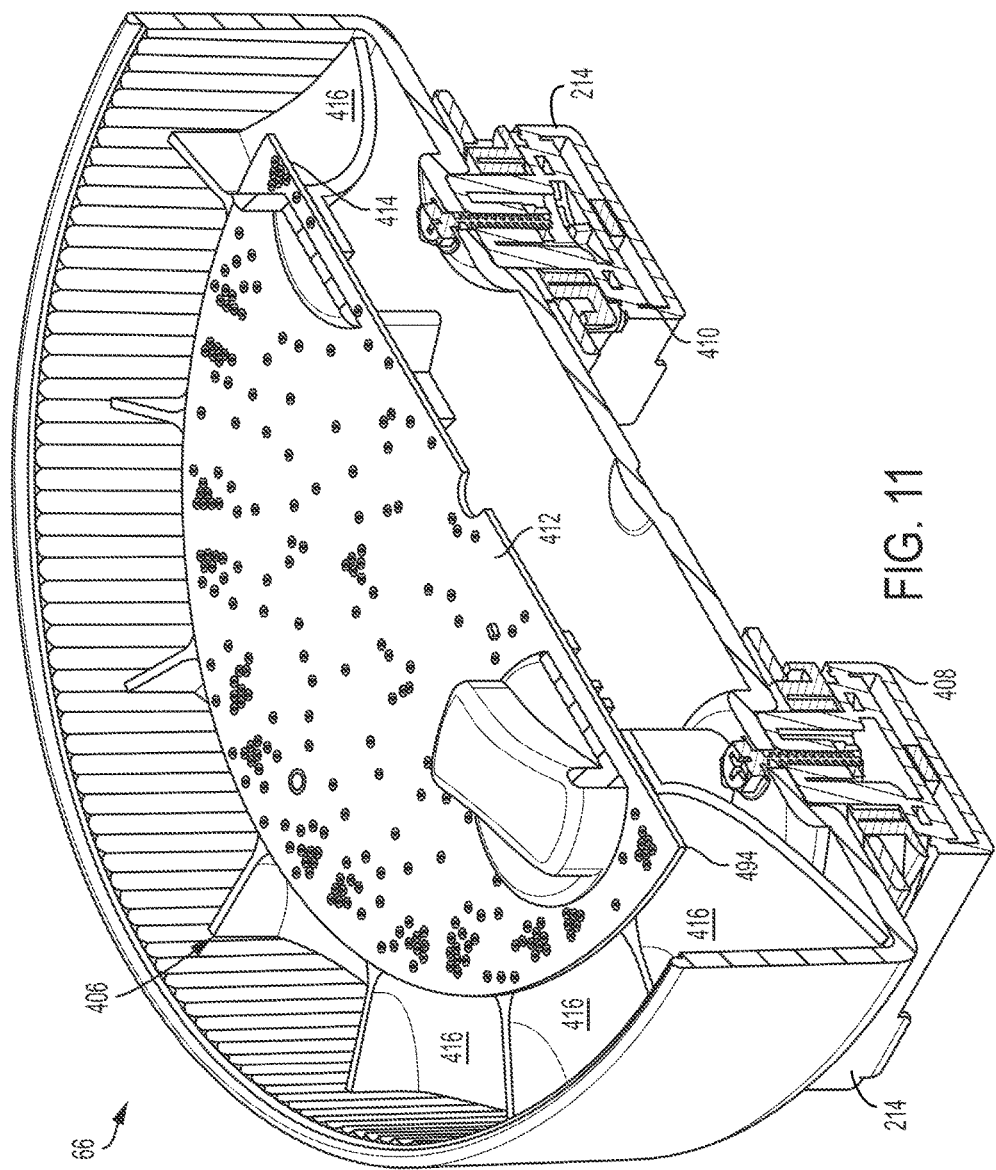
FIG. 11 is an isometric cross-sectional view of a light beacon with its top panel removed to show an annular parabolic reflector array, the light beacon having two track-mounting feet for placement in respective front- and rear-side mounting tracks.

FIG. 11 shows a section of beacon light module 66 with its top panel removed so as to illustrate an annular parabolic reflector array 406, while also showing additional details of its two track-mounting feet 214 that straddle middle mounting track 112 (FIG. 1). Accordingly, a first track-mounting foot 408 provides for support and stability, whereas a second track-mounting foot 410 receives signals from an associated signal rail (e.g., as described previously with respect to FIG. 6), and provides the lighting control signals to an electronic rotation controller board 412. Electronic rotation controller board 412 controls electronic rotation or flashing activation of multiple LEDs 414 that are mutually circumferentially spaced apart from one another and face a parabolic reflector 416 of annular parabolic reflector array 406. Thus, second track-mounting foot 410 receives power, ground, and lighting control signals that configure beacon light module 66 to operate in one of two modes: rotating or flashing.

When in rotating mode, beacon light module 66 sequentially activates each one of multiple LEDs 414 in a circular fashion to generate standard electronic rotation flash patterns, such as, for example, flash patterns complying with the United Nations Economic Commission for Europe (UN-ECE) Regulation 65 (R65) as explained later with reference to FIG. 21. A low-voltage synchronization signal (see e.g., FIG. 2) is modulated on a signal rail to periodically reset the angular position of the electronic rotation sequence to its initial positions (e.g., zero or 180 degrees, as determined by the contact position of a middle leaf-spring). For example, when second track-mounting foot 410 is placed within front mounting track 110, the low-voltage synchronization signal resets the angular position of the electronic rotation sequence to zero degrees, but when second track-mounting foot 410 is placed within rear mounting track 114, the low-voltage synchronization signal resets the angular position of the electronic rotation sequence to 180 degrees. The low-voltage synchronization signal thereby maintains rotational synchronization between two different beacons that may have slightly different internal timing drift, may be associated with different signal rails, and are perhaps spaced apart on opposite sides of a light bar.

When in flashing mode, beacon light module 66 flashes in synchronism with other light modules associated with a common signal rail. Beacon light module 66, however, is larger and capable of dissipating heat, in which case it may optionally ignore PWM signals (e.g., when a light bar is in nighttime operational mode).

Changing beacon light module 66 from rotating mode to flashing mode is achieved by use of a low-voltage signal or data byte provided to circuitry of electronic rotation controller board 412. The signal or data byte and the aforementioned low-voltage synchronization signal are not detected by other light modules associated with a common signal rail because these low-voltage signals are not detectable by circuitry of circuit boards 334 (FIG. 7). Thus, directional light modules, for example, may continue producing illumination in response to electrical signals irrespective of whether those signals include data communicated via the associated signal rail.

Figure 12:
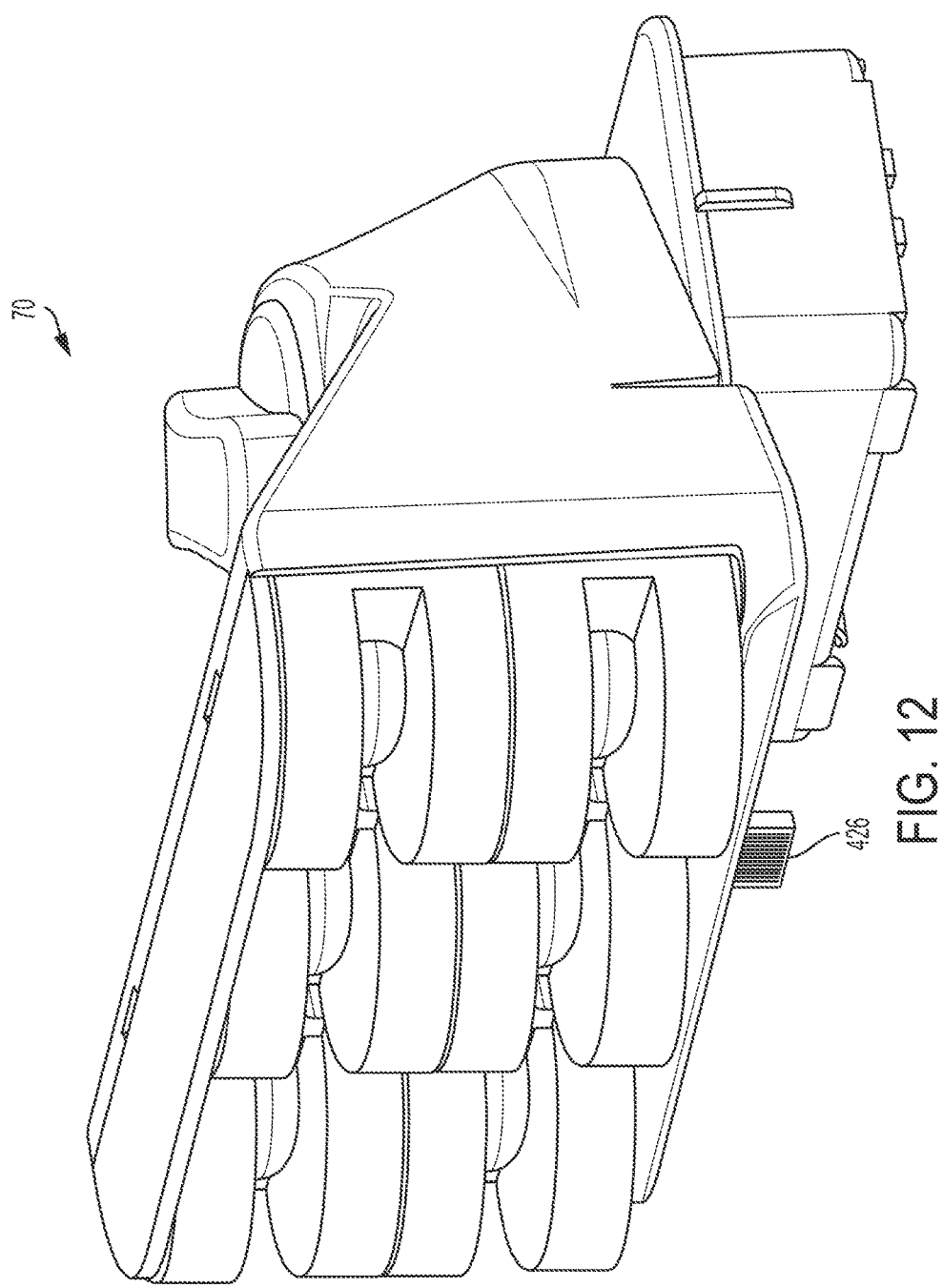
FIG. 12 is an isometric frontal view of an STI light module.

FIG. 12 shows an STI light module 70 including a connector 426 that plugs into receptacle 224' (FIG. 4). FIG. 13 shows a cross-section of a middle-track light module 76. Module 76 is similar to a vehicle's interior dome light in that it has a translucent cover 430 to disperse in multiple directions light emitted by forward-facing LEDs 434.

Figure 14:
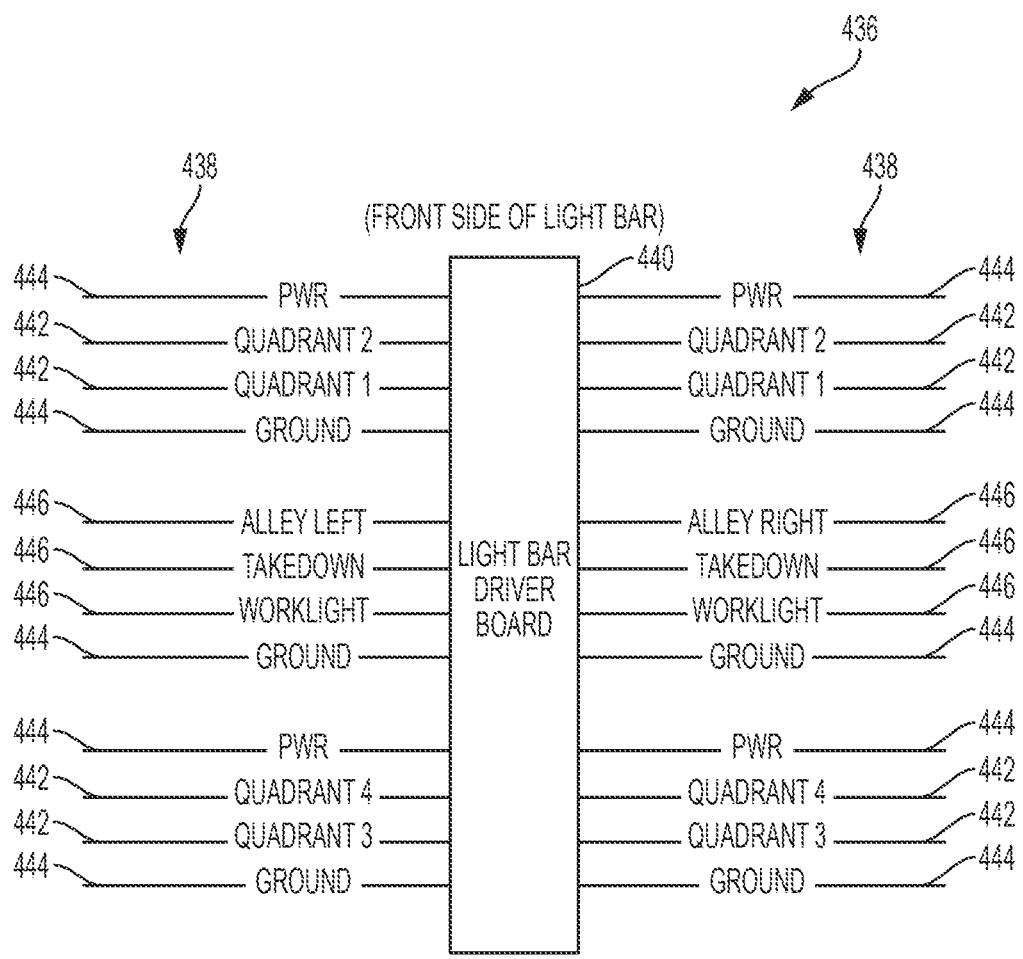
FIG. 14 is a block diagram showing details of electrically conductive pathways.

FIG. 14 is a simplified block diagram 436 showing details of 24 electrically conductive pathways 438 that correspond to those of FIG. 5 (i.e., electrically conductive pathways 274'). Light bar driver board (block) 440 represents electrical circuitry of controller board assembly 276' (FIG. 4) used to apply electrical signals to electrically conductive pathways 438. Lines marked "QUADRANT" represent signal rails 442, which provide a 9-32 volt positive signal applied to a middle leaf-spring electrical contact so as to activate a light module connected to that corresponding signal rail. Illumination dimming is achieved by pulse-width modulation of a signal applied to the signal rail. Lines marked "PWR" and "GROUND" provide power and ground rails 444 to associated directional light modules 56 in light bar 16. Lines marked "ALLEY," "TAKEDOWN," and "WORKLIGHT" also represent power rails 446, which provide 9-32 volt, direct current to whichever power rails 446 are activated. According to some embodiments, no dimming (pulse-width modulation) is used on power rails 446.

Light bar 16 and safety director 44 have multiple, predefined flash patterns, each of which defines a sequence of pulses applied to a combination of signal rails 442 (and through a wire connected to safety director 44). For example, a flash pattern may repetitively activate a cycle of signals including a first series of short pulses on QUADRANTS 2 and 3, a second series of short pulses on QUADRANTS 1 and 4, and a long pulse on all QUADRANTS.

Sets of flash patterns reside in light bar driver board 440. This allows for one common storage location of flash patterns, such that a user controller (e.g., keypad 30, FIG. 1) may be readily replaced while retaining the set of flash patterns. Thus, at power-up, light bar driver board 440 uploads its set of flash patterns to keypad 30 and safety director 44 (if they are attached).

Turning back to FIG. 1, junction box 20 has power and CAN connection points for light bar 16. In some embodiments, junction box 20 has a 4-pin Micro-Fit 3.0™ connector—available from Molex Incorporated of Lisle, Ill.—for connection of keypad 30, and it has input and output connectors for an auxiliary output used to activate a relay for switching optional auxiliary equipment, a park-lights input (e.g., for conveying a vehicle parking lights signal to light bar 16), additional STI inputs (left, right, and stop), and discrete-wire control inputs from switches that a user may switch to control light bar 16 in lieu of using a keypad. When keypad 30 is connected, however, its commands have priority over controls provided over such discrete wires.

Keypad 30 connects to junction box 20 via cable 34. Two wires of cable 34 provide power and ground from junction box 20. Additional wires of cable 34 provide a CAN interface for data transfers in connection with user manipulation of a user interface in the form of eleven backlit pushbuttons 450 and twelve LED indicators 456. Functionality of the user interface for controlling selection of the flash patterns of light bar 16 and safety director 44 is described as follows.

A preset flash pattern selection button 464 is used to resume activation of a previous flash-pattern state, cycle through three preset flash patterns of light bar 16 (preselected from among 29 possible preset flash patterns explained in subsequent paragraphs), deactivate light bar 16 light modules without storing the current flash-pattern state of light bar 16, or deactivate light modules of light bar 16 while storing the current flash-pattern state of light bar 16. Specifically, pressing button 464 four times cycles light bar 16 through the following sequence: resuming activation of a previously stored flash-pattern state, such as a first preset flash pattern; activation of a second preset flash pattern; activation of a third flash pattern that also deactivates electronic rotation (if active); and deactivation of light modules 50 by switching off power to light bar 16. Holding button 464 down for at least two seconds deactivates (switches off) light bar 16, including all of its light modules (directional light modules, worklights, safety director, and auxiliary output), while simultaneously storing its current flash-pattern state.

Two adjacent indicator LEDs 468 indicate which one of the three selected preset flash patterns is currently selected according to illumination of left, right, both, or none of indicator LEDs 468. Indicator LEDs 468 emit light according to two illumination intensity levels: a first brighter one for a daytime operational mode, and a second dimmer one for a nighttime operational mode. These modes are selectable using an illumination control button 470. Likewise, button 464 is illuminated. It is backlit in response to keypad 30 either receiving the park-lights input signal indicating that the vehicle parking lights or headlights are on, or a user activating a nighttime operational mode by selecting illumination control button 470.

Pressing button 470 activates a nighttime operational mode of light bar 16. In this mode, if light modules 50 are actively flashing (or are activated while light bar 16 is in the nighttime operational mode), the flashing will incorporate a reduced PWM duty cycle so as to dim directional light modules 56. According to one embodiment, a duty cycle of about 40% is used during nighttime operational mode (where 100% represents no pulse-width modulation). Pressing button 470 a second time switches off the nighttime operational mode and establishes the regular brightness, daytime operational mode. As noted, button 470 also controls the backlighting for other buttons.

A flash pattern selector button 480 advances light bar 16 to the next available flash pattern, provided light bar 16 is actively flashing according to one of its three preset flash patterns. According to one embodiment, there are 29 available flash patterns, any of which can be assigned to any of the three presets. For example, successively pressing button 480 cycles through the 29 available flash patterns, and when a user stops pressing button 480, the currently selected pattern is stored as the preset that is presently active (as indicated by indicator LEDs 468). If button 480 is held down for more than a second, then the flash pattern moves to a previous pattern in the series of 29, instead of advancing by one pattern. There is also a timeout feature, whereby after one minute of operation, button 480 becomes inactive. This feature, in addition to the recessed lower profile of button 480, reduces the likelihood of inadvertent flash pattern changes caused by mistakenly pressing button 480. If the button timeout has occurred, then a double-press of button 480 will reactivate its selector functionality.

Corner LEDs 486 indicate to an observer of the user interface how light modules of light bar 16 are flashing. A left front LED flashes in response to a QUADRANT 1 signal. A right front LED flashes in response to a QUADRANT 2 signal. A left rear LED flashes in response to a QUADRANT 3 signal. And a right rear LED flashes in response to a QUADRANT 4 signal. Thus, each of corner LEDs 486 flashes whenever a corresponding directional light module in light bar 16 is actively producing illumination. Also, corner LEDs 486 are active and do not flash when a so-called steady-on lighting pattern is selected, which is typically used when beacon light modules 66 are in a rotational mode. Corner LEDs 486 are active for several seconds after a new pattern is selected, but then they switch off so as to not distract a person inside the vehicle. Similar to indicator LEDs 468, the intensity of the illumination produced by corner LEDs 486 is brighter for daytime operational mode, and dimmer for nighttime operational mode.

A cruise mode button 490, when pressed, activates all of the flashing directional modules and beacon light modules 66 in the light bar 16 in steady-on mode at a duty cycle of about 30%, but other duty cycles are possible. Pressing button 490 a second time switches off cruise mode.

Task light buttons 494, when pressed, switch on or off corresponding alley, worklight, or takedown light modules. Specifically, left and right task light buttons 494 control, respectively, ALLEY LEFT and ALLEY RIGHT signal rails. Worklight and takedown task light buttons 494 control, respectively, WORKLIGHT and TAKEDOWN signal rails.

Task light buttons 494 also are used to configure light bar 16. For example, according to one embodiment, the mode of beacon light modules 66 switches between rotating mode and flashing mode in response to a user simultaneously pressing and holding left and right (alley light) task light buttons for two seconds. In response, corner LEDs 486 flash for two cycles according to a pattern indicating the currently selected mode. For rotating mode, corner LEDs 486 each flash in a clockwise sequence to signal electronic rotation. For flash mode, corner LEDs 486 all flash simultaneously. Thus, corner LEDs 486 indicate whether the rotational mode of beacon light modules 66 has been changed between rotate and flash modes. In another embodiment, simultaneously pressing and holding work and takedown light buttons for two seconds changes an available set of lighting flash patterns from a first set of R65 compliant patterns to a second set of patterns that may include predefined patterns that are not R65 compliant. This allows light bar 16 to enable and disable strict R65 compliance, without necessitating a firmware change to do so.

Auxiliary button 496 switches on or off the auxiliary output of junction box 20. It is meant to control an external relay, which in turn will control an auxiliary light or other unit, such as a loudspeaker, horn, or other electronic device.

Six indicator LEDs 500 indicate the flash pattern of safety director 44. Pressing a left button 502 switches safety director 44 on or off. Pressing a right button 504 advances to a subsequent safety director flash pattern. If button 504 is pressed for more than one second, the selected flash pattern returns to the previous pattern available. Safety director 44 also has a preset flash pattern, such that when safety director 44 is powered on, it resumes flashing according to its previously selected preset flash pattern.

Figure 15:
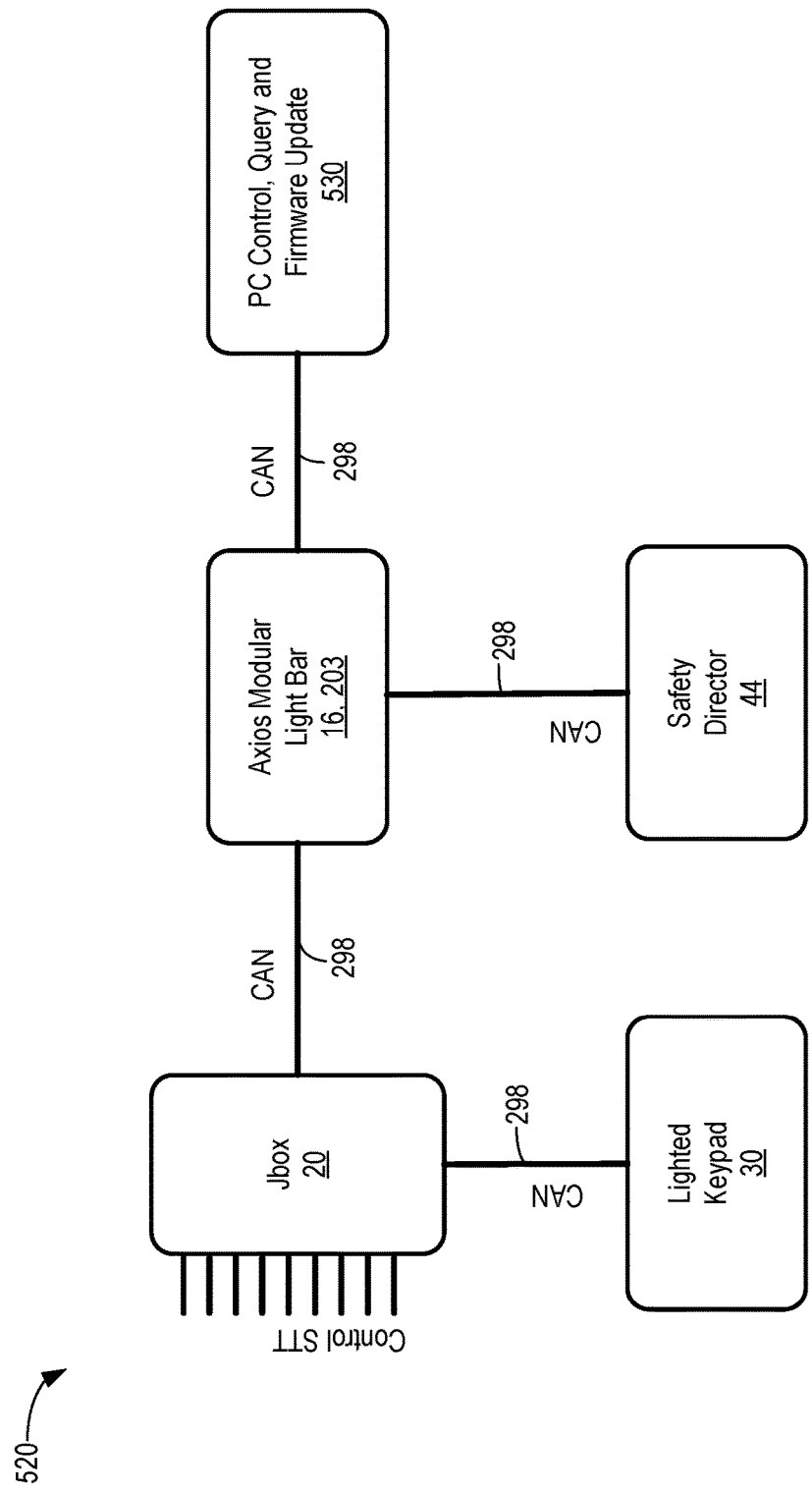
FIG. 15 is a block diagram of a modular light bar system, referred to as an Axios modular light bar system having components including a junction box (or JBox), a backlit keypad, a light bar, and safety director, according to one embodiment; and showing a computer in communication with the Axios modular light bar system for updating its firmware through a CAN bus shared by the components.

FIG. 15 shows another embodiments of an Axios light bar system 520 available from Electronic Controls Company (ECCO) of Boise, Id. System 520 includes a light bar (such as light bar 16 or 230) that carrier a variable number of independently controllable light modules. As described previously, light bar 16, 230 provides a CAN bus interface, a set of buffered 12-volt tolerant inputs, a set of 12-volt metal rail output drivers, and a local power regulator. Additional devices of system 520 may include keypad 30, JBox 20 including a discrete-wire interface, safety director light bar 44, and a personal computer (PC) 530 for purpose of software updating, monitoring, and debugging. These CAN node components communicate with one another and with other devices via CAN bus 298.

An Eaglet light bar—also available from ECCO—is analogous to the Axios light bar, but while the Axios light bar has its aforementioned set of conductive signal rails that carry so-called "QUADRANT" and power supply signals to multiple light modules, the Eaglet system includes buffered light bar microprocessor port pins managed by a discrete-wire interface controlling separate signals carried to individual light modules. The Eaglet system also includes a port expander integrated circuit (IC) to increase the number of lights that can be controlled, up to 28 total light modules. The discrete-wire interface and port expander are typically not included in the Axios light bar because it has a predetermined number of rails and therefore need not be equipped with the port expander or the discrete-wire interface. Nevertheless, the messaging platform described in this paper may be used to control lights and pattern displays of either the Eaglet or Axios system because both systems include a channel map that activates a predefined set of output pins based on a product configuration file that maps the message to the pins.

1.1 Software Overview

Figure 16:
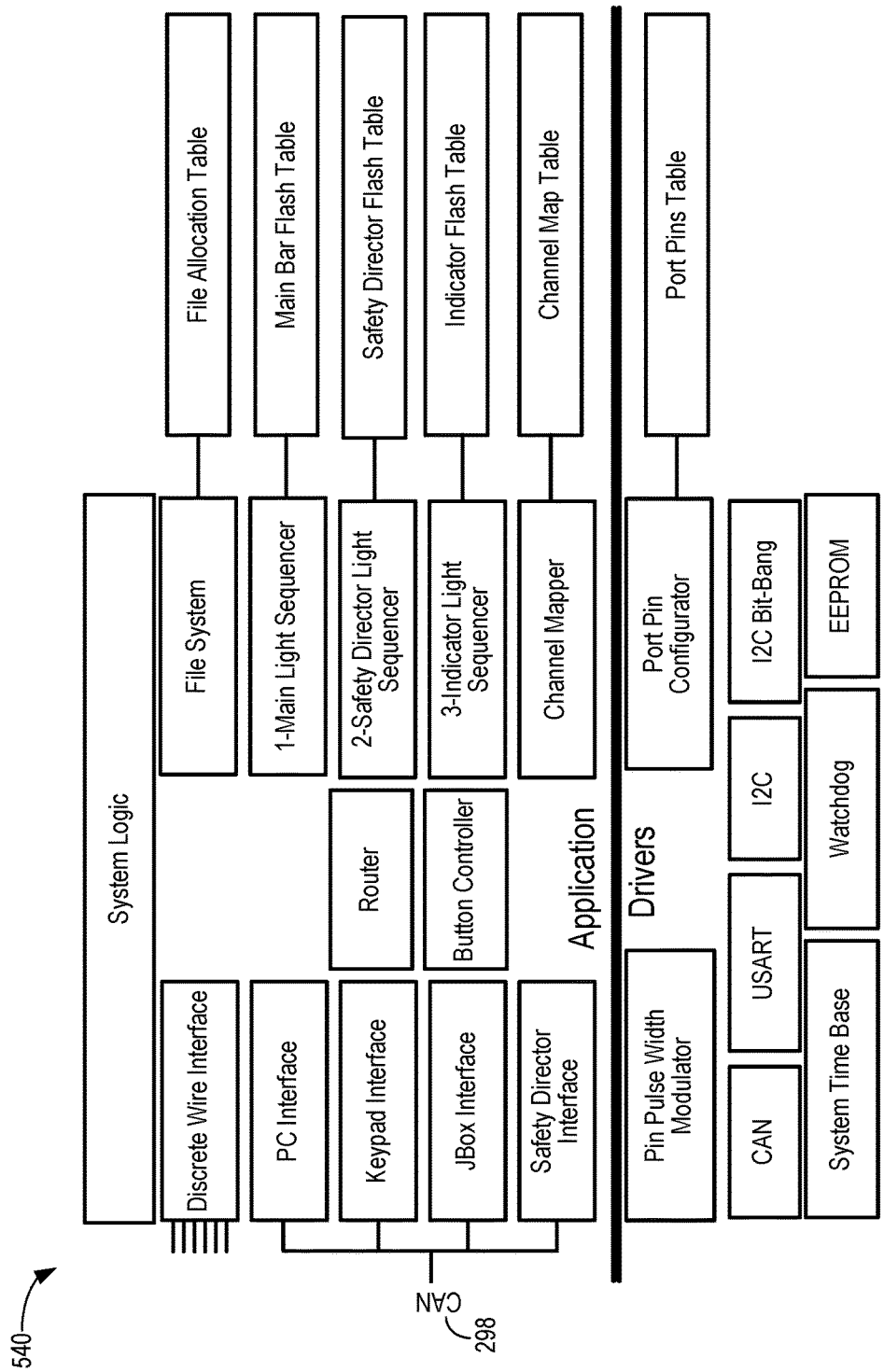
FIG. 16 is a block diagram of Axios microcontroller firmware modules.

FIG. 16 shows light bar firmware 540 comprised of modules having specific functions. The modules are separated into two general categories: hardware driver modules and application modules.

The hardware driver modules (or simply, drivers) are tailored for compatibility with a model of microcontroller employed in the light bar. They provide a hardware abstraction layer (HAL) and a standard application programming interface (API). The HAL and API simplify the management of lower level microcontroller peripheral components including a CAN bus, timers, and other peripheral components that are each managed through a dedicated set of registers. In other words, the registers are complex and many register operations rely on specific sequences and timing. Thus, the HAL and API simplify the control of the register contents by providing desired peripheral component functionality in an intuitive manner to an application layer.

The application modules in the application layer—and in particular, the system logic and light sequencers discussed in this disclosure—use the drivers and module-to-module control messages to implement functions for receiving and acting on user (or vehicle) requested commands. Accordingly, the application modules need not be specific to the particular microcontroller on which they are executed. In other words, the application modules are readily portable to another device having drivers exposing a compatible API.

Control messages are communicated using a common messaging platform. Accordingly, messaging application modules (MAMs), which include the application modules (except for a file system module), exchange messages of a common format. Such messaging techniques allow the MAMs to be generally independent and loosely coupled to the other modules in the system. For example, calling a module's methods by name depends on foreknowledge of those methods' signatures. But MAMs implement one standardized MessageIn( ) method. Accordingly, when each MAM receives a message, it can then decide what (if anything) to do with the received message. Also, MAMs send messages to a common message queue maintained by a message router module and therefore need not invoke a final recipient's interfaces. Thus, the messaging platform allows modules to be more loosely coupled.

Many of the same application modules may be found in multiple light bar components. For example, the Axios keypad, the safety director light bar, and the Eaglet light bar may employ a similar set of application modules because each product has a set of configuration tables (right side of FIG. 16) that customizes modules of the particular product.

Section 2: Application Module Messaging 2.0 ULC Message Format

Figure 17:
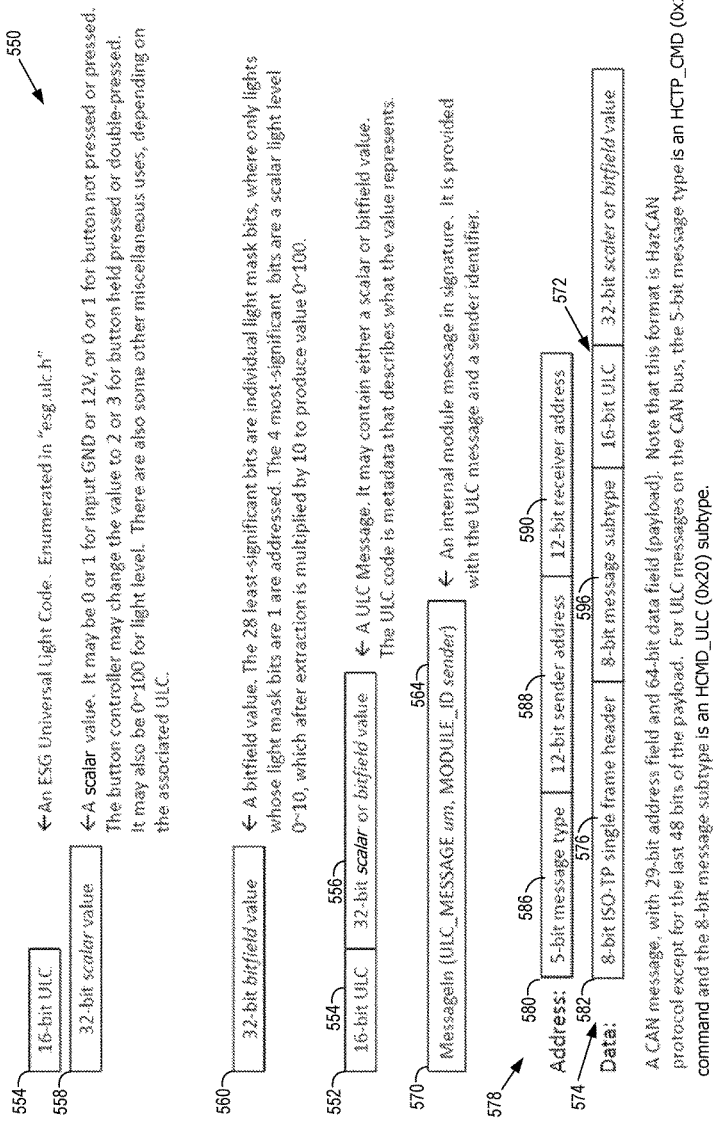
FIG. 17 is an annotated block diagram of a universal light code (ULC) message that describes the ULC message format and protocol, as well as an example of an encapsulation of a ULC message in a CAN message, according to one embodiment.

FIG. 17 shows an annotated hierarchical diagram 550 of components forming a ULC message 552. ULC message 552 includes a 16-bit ULC metadata field (i.e., a ULC of Table 1) 554 and a 32-bit data value 556. 16-bit ULC metadata field 554 defines a system action or property for 32-bit data value 556. Examples of system actions include activating illumination of a light module, initiating or changing a light flash pattern, or erasing the firmware. Examples of properties include the hardware serial number or the firmware revision number. In other words, a metadata code of field 554 defines an operative relationship between value 556 and a lighting device of the light bar system.

According to one embodiment, established ULC message types (or simply, ULCs) are predefined in a large enumeration, i.e., using #define to predefine an enumeration range allocation over the 65,536 available ULCs. Example ULC message types are provided in an excerpt of a header file shown in Table 1.

TABLE 1

```
/**
*********************************************************************
* @FILE             ESG_ULC.H
* @COPYRIGHT        ©2015 ECCO SAFETY GROUP(ESG) ALL
                    RIGHTS RESERVED.
* @VERSION          2.0.0
* @BRIEF            UNIVERSAL LIGHT CODES
**/
#ifndef __ESG_ULC_H
#define __ESG_ULC_H
#include <stdint.h>
//   stop, tail and turn lights
#define ULC_STT_START                   0
#define ULC_STT_END                     3
//   light code range
#define ULC_LIGHT_START                 4
#define ULC_LIGHT_END                   9999
//   indicator light code range
#define ULC_IND_LIGHT_START             10000
#define ULC_IND_LIGHT_END               10499
//   indicator pattern code range
#define ULC_IND_PATTERN_START           10500
#define ULC_IND_PATTERN_END             10999
//   Safety Director pattern code range
#define ULC_SD_PATTERN_START            11000
#define ULC_SD_PATTERN_END              11999
//   12-Series lightbar pattern code range
#define ULC_12S_PATTERN_START           12000
#define ULC_12S_PATTERN_END             12999
//   14-Series lightbar pattern code range
#define ULC_QUAD_PATTERN_START          14000
#define ULC_QUAD_PATTERN_END            14999
//   button control code range
#define ULC_CONTROL_START               20000
#define ULC_CONTROL_END                 20999
//   system properties code range
#define ULC_SYSTEM_PROPERTY_START       21000
#define ULC_SYSTEM_PROPERTY_END         21999
//   the ESG universal light codes
typedef enum
{
    //  Stop, tail, and turn lights start at 0
    ULC_STOP = ULC_STT_START,
    ULC_TAIL,
    ULC_LEFT_TURN,
    ULC_RIGHT_TURN,
    //   Lights start at 4
    ULC_BITFIELD_OFF = ULC_LIGHT_START,
    ULC_BITFIELD_ON,
    ULC_ROTATING_BEACON,
    ULC_QUADRANT_1,
    ULC_QUADRANT_2,
    ULC_QUADRANT_3,
    ULC_QUADRANT_4,
    ULC_SAFETY_DIRECTOR_1,
    ULC_SAFETY_DIRECTOR_2,
    ULC_SAFETY_DIRECTOR_3,
    ULC_SAFETY_DIRECTOR_4,
    ULC_SAFETY_DIRECTOR_5,
    ULC_SAFETY_DIRECTOR_6,
```

TABLE 1-continued

```
    ULC_SAFETY_DIRECTOR_7,
    ULC_SAFETY_DIRECTOR_8,
    ULC_TAKEDOWN,
    ULC_WORKLIGHT,
    ULC_ALLEY_LEFT,
    ULC_ALLEY_RIGHT,
    ULC_AUX_OUTPUT,
    ULC_SYNC_OUTPUT,
    ULC_HEAD_1,
    ULC_HEAD_2,
    ULC_HEAD_3,
    ULC_HEAD_4,
    ULC_HEAD_5,
    ULC_HEAD_6,
    ULC_HEAD_7,
    ULC_HEAD_8,
    ULC_HEAD_9,
    ULC_HEAD_10,
    ULC_HEAD_11,
    ULC_HEAD_12,
    ULC_HEAD_13,
    ULC_HEAD_14,
    ULC_HEAD_15,
    ULC_HEAD_16,
    ULC_HEAD_17,
    ULC_HEAD_18,
    ULC_HEAD_19,
    ULC_HEAD_20,
    ULC_HEAD_21,
    ULC_HEAD_22,
    ULC_HEAD_23,
    ULC_HEAD_24,
    ULC_HEAD_25,
    ULC_HEAD_26,
    ULC_HEAD_27,
    ULC_HEAD_28,
//  Indicator lights for keypads & other control devices start at 10k
    ULC_IND_BACKLIGHT = ULC_IND_LIGHT_START,
    ULC_IND_AUX,
    ULC_IND_CRUISE,
    ULC_IND_DIMMED,
    ULC_IND_PATTERN_1,
    ULC_IND_PATTERN_2,
    ULC_IND_TAKEDOWN,
    ULC_IND_WORKLIGHT,
    ULC_IND_ALLEY_LEFT,
    ULC_IND_ALLEY_RIGHT,
//  Indicator light patterns start at 10500
    ULC_IND_INDEXED_PATTERN = ULC_IND_PATTERN_START,
    ULC_IND_Stop,
    ULC_IND_Beacon_Flash,
    ULC_IND_Beacon_Rotate,
    ULC_IND_Reg65_Only,
    ULC_IND_All_Patterns,
//  Safety Director patterns start at 11000
    ULC_SD_INDEXED_PATTERN = ULC_SD_PATTERN_START,
    ULC_SD_Stop,
    ULC_SD_Left,
    ULC_SD_Left_Solid,
    ULC_SD_Right,
    ULC_SD_Right_Solid,
    ULC_SD_Center_Out,
    ULC_SD_Center_Out_Solid,
    ULC_SD_Wig_Wag,
    ULC_SD_Alternating,
    ULC_SD_Quad_Flash,
    ULC_SD_Alternating_Center_Pulse,
    ULC_SD_Quad_Flash_Center_Pulse,
//  12-Series patterns start at 12000
//  14-Series patterns start at 14000
    ULC_LB_INDEXED_PATTERN = ULC_QUAD_PATTERN_START,
    ULC_LB_Stop,
    ULC_LB_Steady_PWM_50,
    ULC_LB_Double_75_FPM,
    ULC_LB_Title_13_Quad_65_FPM,
    ULC_LB_Title_13_Double_65_FPM,
    ULC_LB_Quint_Hold_75_FPM,
    ULC_LB_Pulse_8_Burst_75_FPM,
    ULC_LB_Reg_65_Single_120_FPM,
    ULC_LB_Reg_65_Double_120_FPM,
```

TABLE 1-continued

```
    ULC_LB_Reg_65_Triple_120_FPM,
    ULC_LB_Reg_65_Quad_120_FPM,
    ULC_LB_Reg_65_Burst_120_FPM,
    ULC_LB_Reg_65_Single_S_S_120_FPM,
    ULC_LB_Reg_65_Double_S_S_120_FPM,
    ULC_LB_Reg_65_Triple_S_S_120_FPM,
    ULC_LB_Reg_65_Quad_S_S_120_FPM,
    ULC_LB_Reg_65_Burst_S_S_120_FPM,
    ULC_LB_Quad_Alternate_S_S_150_FPM,
    ULC_LB_Quad_Cross_Alternate_150_FPM,
    ULC_LB_Double_Alternate_S_S_150_FPM,
    ULC_LB_Double_Cross_Alternate_150_FPM,
    ULC_LB_Quint_Hold_Alternate_S_S_150_FPM,
    ULC_LB_Quint_Hold_Cross_Alternate,
    ULC_LB_Quad_Alternate_S_S_150_FPM_Front,
    ULC_LB_Quad_Alternate_S_S_150_FPM_Rear,
    ULC_LB_Double_Alternate_S_S_150_FPM_Front,
    ULC_LB_Double_Alternate_S_S_150_FPM_Rear,
    ULC_LB_Quint_Hold_Alternate_Side_to_Side_Front,
    ULC_LB_Quint_Hold_Alternate_Side_to_Side_Rear,
    ULC_LB_CycleAll,
// new cp
    ULC_LB_Reg_65_Single_S_S_120_FPM_Center_Pulse,
    ULC_LB_Reg_65_Double_S_S_120_FPM_Center_Pulse,
    ULC_LB_Reg_65_Triple_S_S_120_FPM_Center_Pulse,
    ULC_LB_Reg_65_Quad_S_S_120_FPM_Center_Pulse,
    ULC_LB_Reg_65_Burst_S_S_120_FPM_Center_Pulse,
    ULC_LB_Quad_Alternate_S_S_150_FPM_Center_Pulse,
    ULC_LB_Double_Alternate_S_S_150_FPM_Center_Pulse,
    ULC_LB_Quint_Hold_Alternate_S_S_150_FPM_Center_Pulse,
    ULC_LB_Quad_Alternate_S_S_150_FPM_Front_Center_Pulse,
    ULC_LB_Quad_Alternate_S_S_150_FPM_Rear_Center_Pulse,
    ULC_LB_Double_Alternate_S_S_150_FPM_Front_Center_Pulse,
    ULC_LB_Double_Alternate_S_S_150_FPM_Rear_Center_Pulse,
    ULC_LB_Quint_Hold_Alternate_Side_to_Side_Front_Center_Pulse,
    ULC_LB_Quint_Hold_Alternate_Side_to_Side_Rear_Center_Pulse,
    ULC_LB_Quad_Alternate_S_S_Middle_75_FPM,
    ULC_LB_Quad_Alternate_S_S_Middle_75_FPM_Center_Pulse,
    ULC_LB_Fast_Rotate,
    ULC_LB_Wave_Rotate,
    ULC_LB_Rotate_Quad,
    ULC_LB_Fast_Quad,
    ULC_LB_Random,
// Button control codes start at 20000
    ULC_CC_INDEXED_PATTERN = ULC_CONTROL_START,
    ULC_CC_ON_OFF,
    ULC_CC_TGL_AUX_OUTPUT,
    ULC_CC_TGL_TAKEDOWN,
    ULC_CC_TGL_WORKLIGHT,
    ULC_CC_TGL_ALLEY_LEFT,
    ULC_CC_TGL_ALLEY_RIGHT,
    ULC_CC_TGL_CRUISE,
    ULC_CC_TGL_NIGHT_MODE,
    ULC_CC_ALLEY_COMBO,
    ULC_CC_SAFETY_DIR_COMBO,
    ULC_CC_QUAD_PRESET,
    ULC_CC_QUAD_PATTERN_SEL,
    ULC_CC_SAFETY_DIR_PRESET,
    ULC_CC_SAFETY_DIR_PATTERN_SEL,
    ULC_CC_SAFETY_DIR_FRONT_BACK,
    ULC_CC_SAFETY_DIR_NUM_LIGHTS,
    ULC_CC_PRESET_1,
    ULC_CC_PRESET_2,
    ULC_CC_ALLEY_LEFT,
    ULC_CC_ALLEY_RIGHT,
    ULC_CC_TAKEDOWN,
    ULC_CC_WORKLIGHT,
    ULC_CC_CRUISE,
    ULC_CC_SYNC,
    ULC_CC_AUX_OUTPUT,
    ULC_CC_KEYPAD_SHOW_QUAD_SEQ ,
    ULC_CC_KEYPAD_SHOW_SAFETY_DIR_SEQ,
    ULC_CC_SET_ALL_QUADRANTS,
    ULC_CC_SD_LEFT_SOLID,
    ULC_CC_SD_RIGHT_SOLID,
    ULC_CC_SD_CENTER_OUT_SOLID,
    ULC_CC_SD_WIG_WAG,
    ULC_CC_WORKLIGHT_TAKEDOWN_COMBO,
// System property codes start at 21000
    ULC_SP_REINVOKE_ISP = ULC_SYSTEM_PROPERTY_START,
```

TABLE 1-continued

```
    ULC_SP_SET_SEND_INTERNAL_MESSAGES,
    ULC_SP_GET_FIRMWARE_REV,
    ULC_SP_FIRMWARE_REV,
    ULC_SP_ERASE_FLASH,
    ULC_SP_GET_UID,
    ULC_SP_UID0,
    ULC_SP_UID1,
    ULC_SP_UID2,
    ULC_SP_UID3,
    ULC_SP_GET_APP_CRC,
    ULC_SP_APP_CRC,
    ULC_SP_ERASE_APP,
    ULC_SP_GET_HAZCAN_BOOT_COMPLIANCE,
//  reserved ULC_NONE
    ULC_NONE = UINT16_MAX
} ULC;
#endif  // __ESG_ULC_H
```

FIG. 17 also shows that 32-bit data value 556 may be a scalar value 558, such as an input state or light level, but may also be a bitfield value 560. Two special ULCs (ULC_BIT-FIELD_OFF and ULC_BITFIELD_ON) are used to indicate that the ULC message is carrying non-scalar bitfield values 560. For bitfields, a location of a bit in the field is mapped by system logic to a particular lighting device, such that the value of the bit at the particular location controls the state (or indicates status) of the corresponding lighting device. When the ULC is ULC_BITFIELD_ON, bit values of "1" activate corresponding lighting devices, whereas ULC_BITFIELD_OFF indicates that bit values of "1" deactivate corresponding light device. In another example, bitfields allow for efficient transfer of information from light pattern tables to the light pin modulator (discussed in detail later).

2.1 Internal and External Message Routing

ULC messages are sent between software modules that perform various functions, such as handling user input, providing for system logic, sequencing light emission, and modulating light intensity. The ULC messages may be used between internal modules or passed externally over a CAN bus.

When a ULC message is sent from one internal module to another internal module within the same microcontroller (i.e., sent internally), the internal ULC message includes a 16-bit MODULE_ID sender identification 564. As shown in FIG. 17, an internal message handling method has a signature 570 of MessageIn(ULC_MESSAGE um, MODULE_ID sender), where the MODULE_ID is an enumeration representing the types of MAMs. MAMs, therefore, may send messages without identifying a recipient module, which also facilitates a loose coupling among the modules.

FIG. 17 also shows in that a ULC message may also be sent between modules of separate CAN node devices via a CAN bus (i.e., sent externally). CAN-node interface modules (FIG. 16, and discussed further on) include a ULC-message encapsulation port to pack and unpack a ULC message within a CAN message and thereby provide a bridge to the CAN bus. In other words, the ULC-message encapsulation ports translate CAN messages having embedded ULC messages.

When sent over the CAN bus, a ULC message is encapsulated 572 as a payload of an ISO-TP single-frame message 574 (e.g., by an ISO 15765-2 single frame header 576, as defined under an international standard for sending data packets over a CAN bus), which in turn is encapsulated as a payload of a CAN-like message 578 according to an implementation of the CAN protocol called HazCAN developed by Hazard Systems Pty. Ltd. of Launceston, Australia. The HazCAN protocol calls for an address field 580 and a data field 582.

Address field is based on an extended CAN message (under an international standard format of the CAN protocol) providing 29 bits of "Address" information. The 29-bits includes a 5-bit message type 586, a 12-bit CAN sender address 588, and a 12-bit CAN receiver address 590. Examples of the message types and the addresses for CAN nodes are shown in Tables 2 and 3, respectively.

TABLE 2

```
// HazCAN (HC) message type (TP) /priority codes
// (upper 5-bits of CAN ID)
// (odd numbers reserved for response messages)
#define HCTP_PRI     0x02 // top priority
#define HCTP_RSVD    0x06 // reserved
#define HCTP_CMD     0x10 // Axios message/HazCAN command
#define HCTP_CMDRSP  0x11 // HazCAN command response
#define HCTP_STATUS  0x14 // HazCAN status
#define HCTP_LO      0x1F
```

Figure 18:
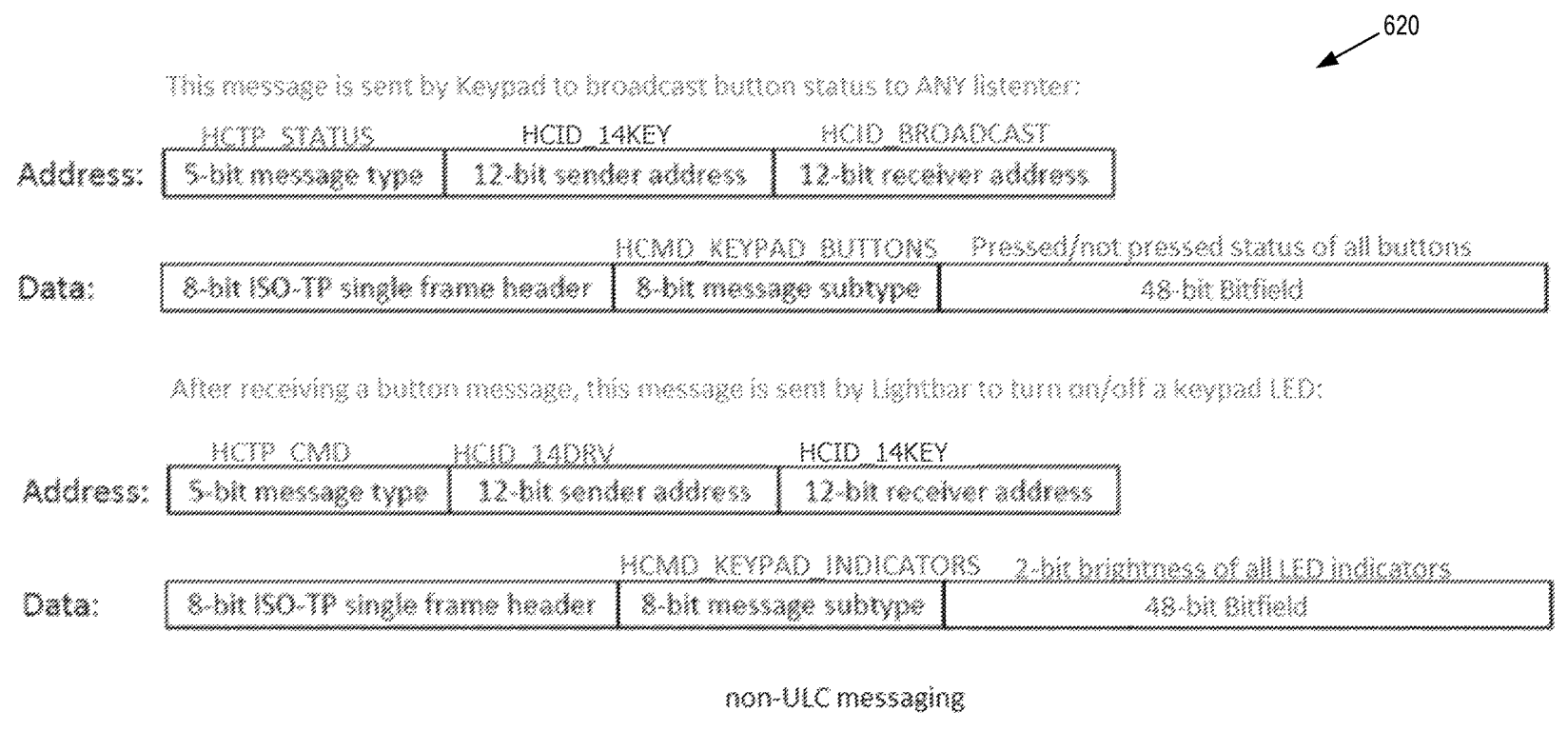

The 5-bit message type for carrying a ULC messages is set to a hexadecimal value of 0x10. This value is intended to preserve interoperability with other conventional HazCAN nodes. Other types of messages, such as non-ULC messages (see e.g., FIG. 18), may use other values, such as the valued defined as HCTP_STATUS.

TABLE 3

```
// HazCAN (HC) hardware node IDs
#define HCID_BROADCAST  0x000
#define HCID_PCAN       0x100
#define HCID_MTC        0x200
#define HCID_MATRIX     0x210
#define HCID_JBOX       0x220
#define HCID_LBAR       0x300
#define HCID_14DRV      0xE00   // ESG Axios driver board
#define HCID_14KEY      0xE10   // ESG Axios keypad
#define HCID_14DIR      0xE20   // ESG Safety Director
#define HCID_EAGLET     0xE30   // ESG Eaglet driver board
#define HCID_BTLDR      0xE40   // ESG bootloader
```

12-bit CAN receiver address 590 identifies a CAN node recipient. If the 12-bit CAN receiver address is zero, then the CAN message is a broadcast message received by each CAN node sharing the CAN bus. 12-bit CAN sender address 588, and a message subtype 596 (e.g., shown in Table 4), allows a recipient CAN node to infer the internal MAM that generated the CAN message of the sending CAN node device. Thus, when a ULC message is generated by a CAN node, such as computer 530 (FIG. 15), and is encapsulated in the HazCAN format received by the Axios PC interface module (FIG. 16), the PC interface module of the Axios PC interface simply adds a MODULE_ID to an internal module message before forwarding that message to the message router module. This is useful because the Axios and Eaglet light bars employ an implementation of the CAN protocol that provides no additional header space for including a MODULE_ID of a MAM originating the CAN message.

TABLE 4

| // HazCAN (H) light bar commands (CMD) | |
|---|---|
| #define HCMD_ULC | 0x20 //for ULC messages |
| //for non-ULC messages (messages that contain no ULC) | |
| #define HCMD_DIO | 0x01 // control JBox Aux Out |
| #define HCMD_LBAR_STATE | 0x03 |
| #define HCMD_KEYPAD_BUTTONS | 0xE0 //keypad button state |
| #define HCMD_KEYPAD_INDICATORS | 0xE1 //keypad indicator state |
| #define HCMD_KEYPAD_IND_LEVELS | 0xE2 //keypad indicator levels |
| #define HCMD_SAFETY_DIRECTOR_LIGHTS | 0xE3 //keypad indicator state |
| #define HCMD_SAFETY_DIRECTOR_LEVELS | 0xE4 //keypad indicator levels |

For CAN bus messages, when a message is sent that contains a ULC, then the message subtype is set to the value defined as HCMD_ULC (0x20). Other messages, however, such as those between the JBox, safety director, and keypad, use one of the other non-ULC subtypes shown in Table 4. Accordingly, in lieu of the 16-bit ULC shown in FIG. 17, the ISO-TP framed bitfield is extended to encompass the full 48 bits shown in examples 620 of FIG. 18.

In yet another embodiment, some CAN nodes (e.g., a JBox) send out status messages for which a purpose, defined by accompanying metadata, is fully set forth in the 29-bit address field. Accordingly, these embodiments do not use the ISO-TP frame and message subtype fields in the data field. All 64 bits are then available for bitfield information.

2.2 ULC Messaging Example

The steps involved in controlling a worklight provide a practical example for understanding ULC messages in action. For example, a worklight module in the Eaglet light bar can be activated and deactivated (i.e., controlled) by applying or removing a voltage to a discrete wire of the discrete-wire interface module. The discrete-wire interface module then outputs a ULC_CC_WORKLIGHT (where "CC" means a ULC control-code message type) ULC message having a data value indicating that the wire state is active (e.g., a logic value of one) or inactive (e.g., a logic value of zero). Similarly, in the Axios system, the worklight may also be controlled by pressing and releasing a corresponding worklight activation button on the keypad, in which case, a keypad interface module outputs a ULC_CC_TGL_WORKLIGHT (where "TGL" means toggle the illumination state of the worklight) message having a payload value indicating that the wire state is active (e.g., a value of one) or inactive (e.g., a value of zero).

Note that a distinction between direct wire logic and button toggle logic is made by having two different control codes that, from a user's perspective, achieve the same functional outcome of controlling the worklight module. In addition, a button controller module (discussed later) deploys a similar distinction when it generates a "COMBO" message type representing a combination of button inputs for special user functions (described in section 5).

A system logic module receives the wire or button ULC message and generates a ULC_WORKLIGHT ULC message to control the illumination state of the worklight. (Section 11.1 provides a description of how this message is routed and mapped to a pin that produces a signal to control the illumination state of the worklight.) The system logic module recognizes the state change and will therefore broadcast a ULC_IND_WORKLIGHT message (where "IND" means a button backlight indicator) to control the illumination state of a corresponding button backlight of the keypad so that the backlight indicates the illumination state of its corresponding worklight.

In the above example, the control-code ULCs are input to the system logic module, which then produces the worklight ULC messages. A CAN-node interface module, however, may control a light module directly, bypassing the system logic module, by generating an appropriate ULC. For example, a JBox device is wired directly to the vehicle brake lights, and reports the brake light state over the CAN bus. When a light bar is also outfitted with a brake light and receives brake light CAN messages through its a JBox interface module, the module then outputs direct ULC_STOP messages to control the brake light in the light bar.

Section 3: Message Router

Figure 19:
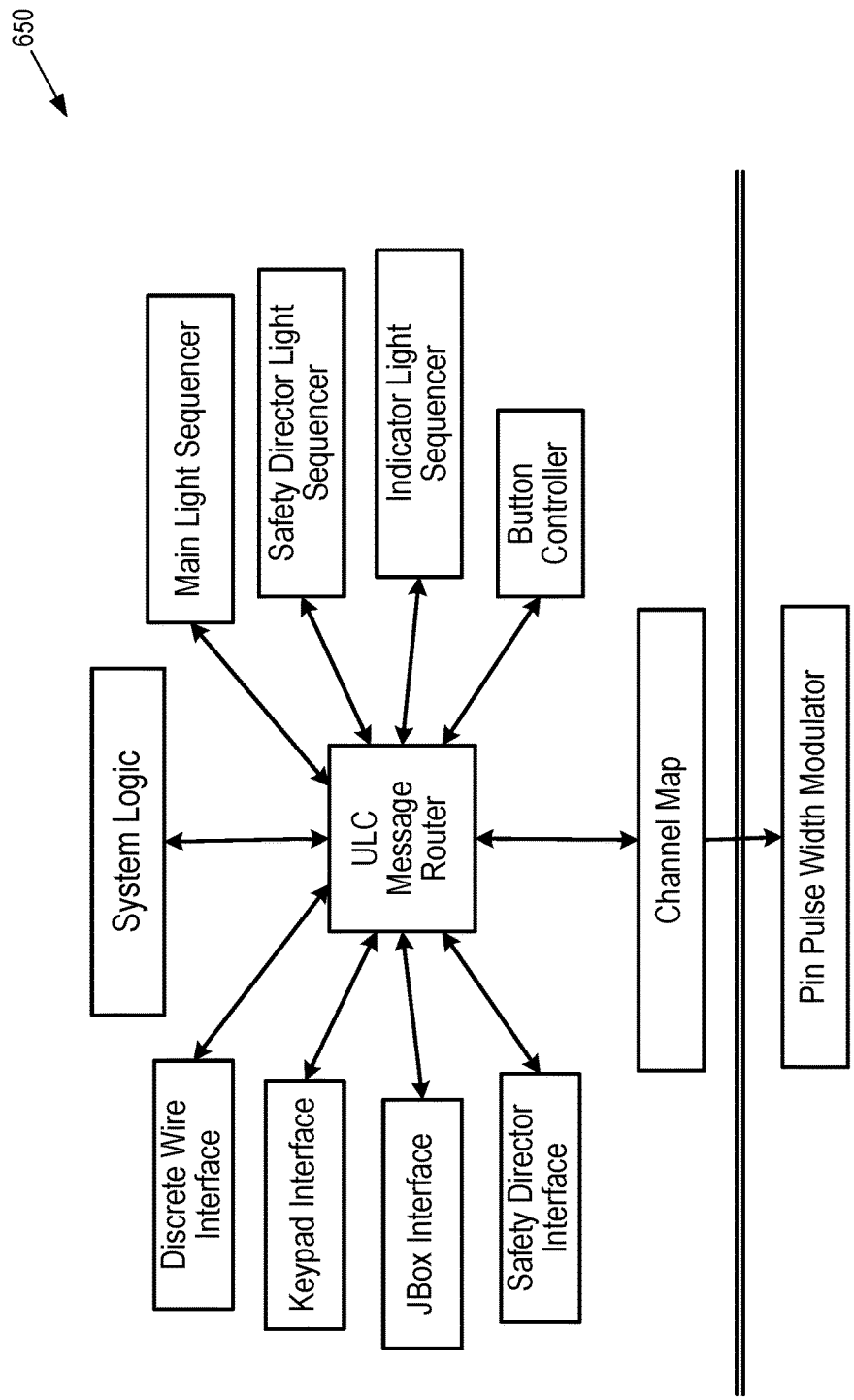
FIG. 19 is a block diagram of ULC message routing components.

FIG. 19 shows an example 650 of a message router module (referred to as simply a router) that enables communication between the ULC-message internal ports of application modules. The router forwards incoming messages to only those modules that should receive them. As previously noted, incoming router messages include a sender address in the form of a MODULE_ID. The router uses the sender address and a look-up table to narrow the list of modules that should receive the message. The router may further eliminate some potential message recipients based on the message content. For example, the system logic module may send a ULC message to start a sequence of flashing lights (e.g., a so-called quad light sequence message), and the router is programmed to not forward that message to the safety director light sequencer.

Because light pattern bitfield messages (see, e.g., description of 32-bit bitfield values of FIG. 17) are primarily intended for a channel map module that controls illumination signals, other MAMs do not process bitfield values. For the receivers that do need to react to the bitfield values, the message router decomposes bitfields and converts them into individual ULC messages that the receivers can recognize. For example, the keypad may be temporarily enabled to cycle on/off several of its LEDs a selected lighting pattern representing the quad light sequencer, so the message router converts the bitfield messages into keypad LED ULC messages. This allows the keypad to show the quadrant light pattern for a brief time when the pattern is first selected.

The message router can also be enabled to forward all message traffic to the PC interface. This feature is used primarily for product development, but can be enabled via the CAN bus at any time.

Section 4: Interface Modules

4.0 Overview

At the periphery of the microcontroller, messages need to propagate to and from other hardware devices. Information flows to and from other devices on the CAN bus, and interface modules perform any necessary translation from HazCAN to ULC messages, and vice versa. The interface modules track the presence of other CAN devices so that the system logic module may know what inputs are available. The interface modules track the state of other CAN devices in order to limit the amount of responsive messaging.

For the Eaglet light bar, information also comes from a discrete-wire input keypad. A discrete-wire interface module tracks the state of the inputs, and generates ULC messages in response to changes.

For both the CAN bus and discrete-wire inputs, the interface modules abstract away the hardware interface details. The message router simply sees them as ULC-capable software modules that represent the other hardware devices.

4.1 CAN Bus Physical Interface and Software Module

A CAN bus peripheral embedded in a microcontroller handles communications at the physical and lowest CAN bus protocol level. A custom software driver adds an additional layer of abstraction and API for the application modules that communicate over the CAN bus. The peripheral supports 32 message objects that may be configured to either transmit or receive. As receivers, the objects include the ability to filter messages by address. The driver initializes the peripheral and provides methods to send a message or configure a message object as a receiver. When a receiver is configured, the driver provides received message callbacks with raw CAN address and data fields to the application modules.

4.2 JBox Interface Module

A JBox interface communicates via the CAN bus with a JBox device. The JBox has discrete-wire inputs that connect to the stop, tail, and turn lights; and discrete-wire inputs for controlling various light bar features. The JBox also has a discrete-wire output for controlling an auxiliary light or device.

The JBox interface module registers with the CAN driver module to receive messages from the JBox device. The JBox interface module queues messages received from the JBox for synchronous message handling. The messages that are sent to and from the JBox via the CAN bus are HazCAN (protocol) bitfield messages (see e.g., examples in FIG. 18, which are non-ULC messages). The JBox interface module converts the bitfield messages to ULC messages, and vice versa. The JBox interface module tracks the JBox discrete-wire state and—for all but stop, tail, and turn wires (explained later)—generates ULC messages when the state changes. The JBox interface module also uses a timer to track the presence of the JBox on the CAN bus.

4.3 Keypad Interface Module

A keypad interface module communicates via the CAN bus with a keypad device. The keypad has dedicated buttons and indicator lights. The keypad interface module registers with the CAN module to receive messages from the keypad. The keypad interface module queues messages received from the keypad for synchronous message handling. The messages sent to and from the keypad via CAN bus are HazCAN bitfield messages. The keypad interface module converts the bitfield messages to ULC messages, and vice versa. The keypad interface module tracks the keypad button state, and generates button messages when the state changes. The keypad interface module also uses a timer to track the presence of the keypad on the CAN bus.

4.4 Safety Director Interface Module

A safety director interface communicates via the CAN bus with a safety director device. The safety director has a single array of lights. The safety director interface module sends messages to the safety director. From the CAN bus, the safety director can process either ULC messages or HazCAN bitfield messages. For improved efficiency, the safety director interface module sends HazCAN bitfield messages to the safety director (although firmware exists for the ULC message mode as well).

4.5 PC Interface Module

A PC interface module communicates via the CAN bus with a personal computer or other device that presents itself on the CAN bus with the PC address. The PC is used to query, control, and firmware-update the other devices on the CAN bus.

The PC interface module registers with the CAN module to receive messages from the PC. The PC interface module queues messages received from the PC for synchronous message handling. Messages received from the PC for flash erase, firmware revision query, hardware ID query, app CRC query, and entering HazCAN firmware updates are handled directly by the PC interface module. All other PC messages are sent to the message router. The PC interface module also sends message router ULC message traffic to the PC when requested by the PC, for use during product development.

4.6 Discrete-Wire Interface Module

A discrete-wire interface module (i.e., present in the Eaglet products) reads the state of six processor input pins that are connected via hardware buffers to external wires. If a user applies 12 volts to the wire, then the associated processor pin input is high, else it is low. The discrete-wire interface module samples the pins once every 20 milliseconds. By only sampling once per 20 milliseconds, the inputs are effectively de-bounced.

The discrete-wire interface module tracks the state of the input pins. If an input state changes, then a ULC message is sent to the router indicating the input ULC and the input value.

Section 5: Button Controller Module

A button controller module listens to incoming ULC control messages. An incoming user input message from a button or discrete wire includes a specific ULC along with the pressed state of the button or voltage state of the wire represented as a logic one or a logic zero. The communication I/O modules only send messages when these states change (with the aforementioned exception of stop, tail, and turn signals).

The button controller module creates new information derived from the user input messages, for use by the system logic. The button controller module creates a new message when certain buttons have been held pressed for a predetermined period. The button controller module recognizes when certain pairs of buttons or wires are actuated concurrently and produces a message indicating a combination of buttons are pressed. For example, if both the Alley Left button and Alley Right button are pressed at once, the button controller will receive ULC_CC_TGL_ALLEY_LEFT and ULC_CC_TGL _ALLEY RIGHT messages. In response, the button controller will then create a new message with the code ULC_CC_ALLEY_COMBO to change the mode of rotating beacons, e.g., from flashing mode to rotating mode.

The button controller module forwards ULC control messages to the router, along with any new messages that it creates. However, in the case of the paired-signal (e.g., COMBO) messages, the button controller will not forward all of the individual messages that comprise the pair. If two paired buttons are pressed and held, then the first button press and the combination press message are forwarded to the router, and when the buttons are released, only the combination release message is forwarded. For such pairs, the system logic only responds to the individual button releases, thus their individual functions will not be actuated when used as a pair.

Section 6: System Logic Module

The system logic module (or simply, system logic) provides for user interaction with the light bar. System logic controls all light bar functionality, with the exception of stop, tail, and turn signals. When the system is first powered up, system logic reads the EEPROM nonvolatile storage to bring all lights, sequencers and keypad indicators to the last saved state.

Thereafter, the system logic handles the user interaction. For example, if the user presses a preset button, then the system logic would start a sequencer, enable the keypad to show the sequence, and then save the current system state. As part of those steps, the system logic would set the light levels based on the current state of the tail light or night mode feature.

Section 7: File System Module

A file system handles storage and retrieval of information in the EEPROM nonvolatile storage IC. All files have a header that identifies the file identifier and size. The file system uses a file allocation table to know the location and size of the files in EEPROM storage. The file system checks for the existence of saved files, and for file errors. Currently, only the system logic system state file is stored.

Section 8: Light Pattern Sequencing 8.0 Sequencers and Tables

A pattern is a sequence of light commands in a flash pattern table. A sequencer module reads a flash pattern from the table and sequentially sends light control ULC messages to the message router. Thus, a light sequencer module controls lights based on a flash pattern table. The Axios light bar, for example, uses three such sequencers: a quad light sequencer, a safety director light sequencer, and a keypad indicator sequencer. Each sequencer is given a pointer to a flash pattern table on system boot.

Figure 20:
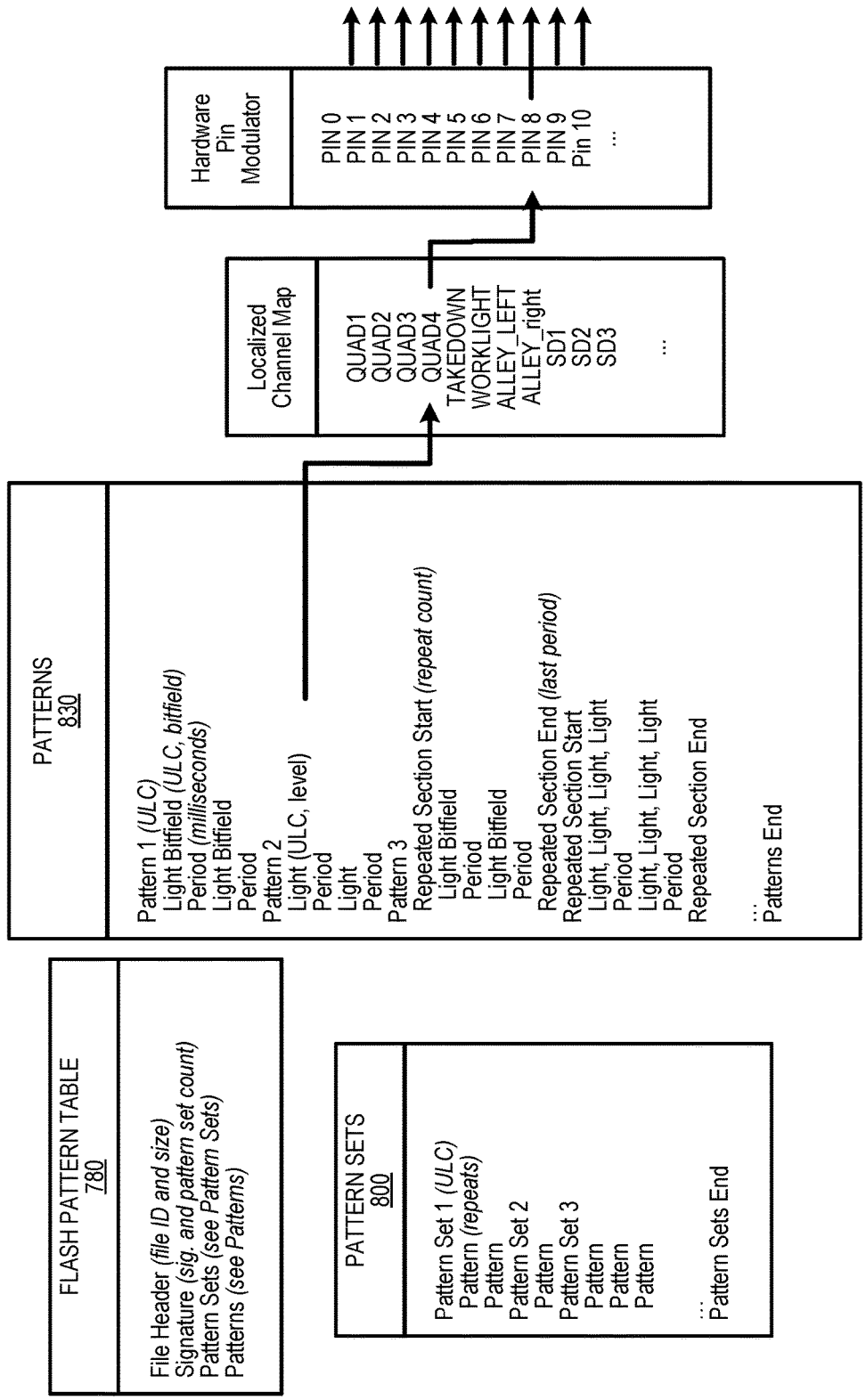
FIG. 20 is a block diagram of a flash pattern table having a channel map and pin modulator.

Referring to FIG. 20, an example flash pattern table 780 is comprised of four sections: a file header, a signature, a list of pattern sets and a list of patterns. Each section is comprised of one or more 32-bit entries. An entry in the table has three fields: ULC, value, and marker. The marker indicates the entry type. The entry type determines the type of information contained in the ULC and value fields, or the combination thereof. The various entry types are described further below.

A first entry in the pattern table is a file header. The file header provides the file type and size for the EEPROM filing system.

A second entry in the pattern table is a flash pattern signature and pattern set count. The sequencer first checks the signature for validity whenever scanning the pattern table. The sequencer provides the pattern set count to other modules upon request.

A third entry in the pattern table is a list of pattern sets. A pattern set 800 is comprised of a header and a set of pattern IDs that represent the patterns to be displayed sequentially. The header contains the pattern set ULC identifier. Each pattern ID entry contains a pattern ULC identifier and the number of times the pattern should be repeated before moving on to the next. The list of pattern sets is terminated with a pattern sets end entry.

A fourth entry in the pattern table is a list of patterns that follows the list of pattern sets. A pattern 830 is comprised of a header and one or more light entries, followed by a millisecond period entry, followed by more light entries, and so on.

The light entry may be of the individual type, containing the light ULC identifier and the light level. The light level is factored by the overall sequencer light level, discussed further on.

The light entry may also be of the bitfield type, where the ULC and level fields are combined into a single field that selects which light levels are to be modified. The bitfield bits map directly to the pin modulator pins 0 through 27 (e.g., for accommodating the 28 wires of the Eaglet system), whose levels are modified if the associated bitfield bit is set. The light entry bitfield type is further classified as either a "bitfield off" or a "bitfield on" entry. The bitfield on entry sets the selected lights to the sequencer light level, and the bitfield off entry turns off the selected lights.

A series of light and period entries may be enclosed by a repeated section start entry and a repeated section end entry. The repeated section start provides the repeat count. The repeated section end provides the final millisecond period, replacing the last period entry for the last repeat of the enclosed series.

8.1 Sequencer in Action

The light sequencer can be given a pattern set ULC identifier to sequence, along with an overall sequence light level. The sequencer first searches for the matching pattern set header in its flash pattern table. If a matching header is not found, then no further action is taken. If a matching pattern set header is found, then the sequencer reads the first pattern ID in the set, and finds the pattern header with the matching ULC identifier.

The sequencer then sends out lighting commands per the following light entries up until a period entry, where it pauses for the given period. After the period expires, if the following entry is a light entry then the pattern continues. If the following entry is not a light entry, then the pattern sequence is complete and the sequencer returns to the current pattern ID entry.

If the entry following the current pattern ID is also a pattern ID, then its associated pattern is sequenced as described above. If the following entry is not a pattern ID, then the sequencer returns to the start of the pattern set and continues.

The light sequencer continues to run the patterns until receiving a stop command. A special case is the first pattern set in the list, which points to the first pattern in the list, which turns off the given lights and stops the sequencer.

The light sequencer can also be given a pattern set index to sequence, for example the third pattern set in the list. In this case the sequence searches the table for pattern sets until the indexed pattern is found. If the index is beyond the count of the pattern sets, then no further action is taken.

Figure 21:
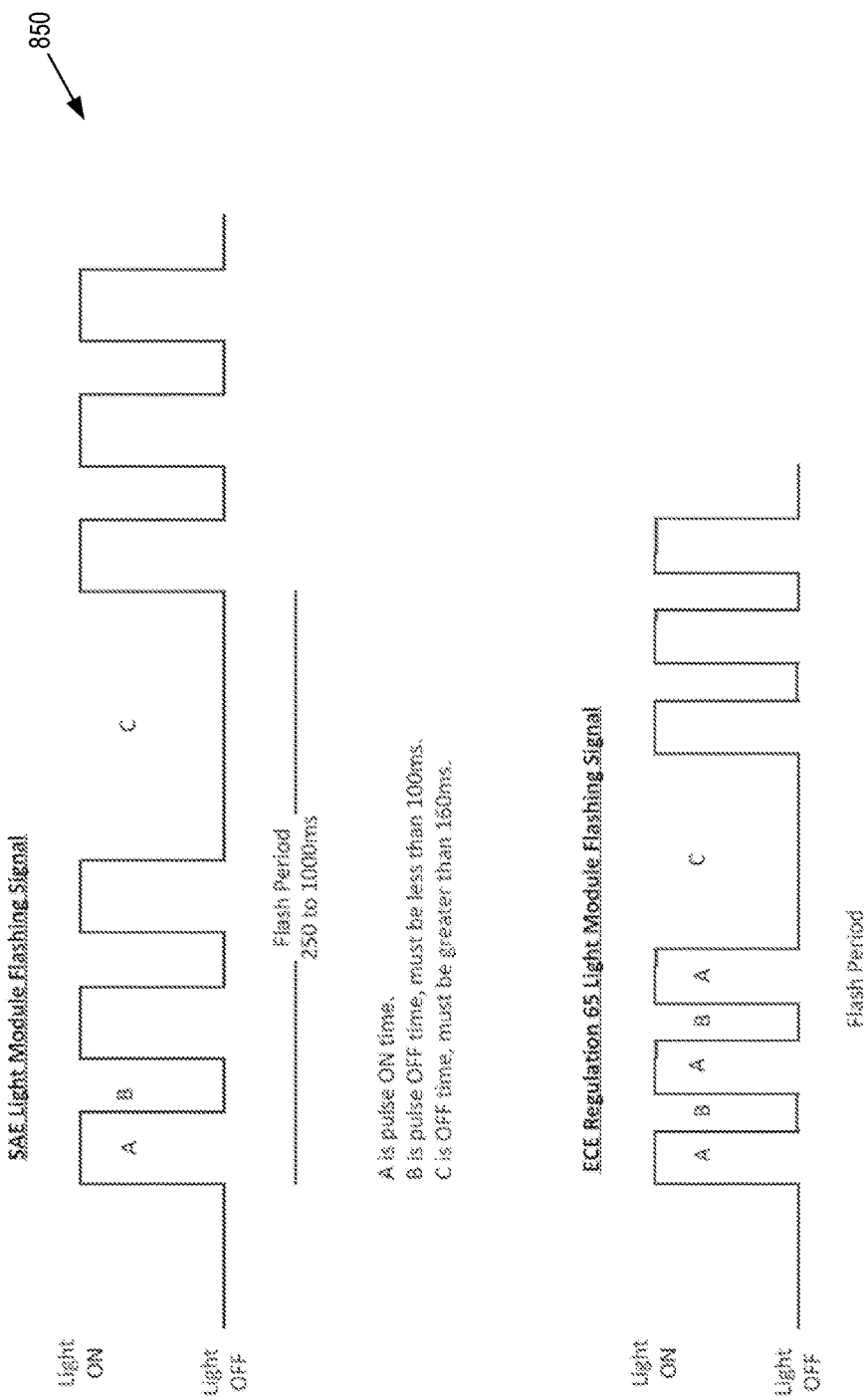
FIG. 21 is a pair of timing diagrams that are annotated for comparing two types of flash patterns.

FIG. 21 details differences between UNECE R65 and Society of Automotive Engineers (SAE) flash patterns 850, showing and describing a triple (3× pulse) flash mode as an example.

Section 9: Channel Map

Referring to FIG. 19, a channel map module translates and routes individual light ULC control messages to the pin modulator, per a product-specific channel map table. The purpose of the channel map is to allow ULC identifiers to be used universally across many products, where each product may assign different processor pins to lights at the hardware level.

The channel map also routes bitfield light messages directly to the pin modulator. The bitfield messages do not need any translation. Bitfield bits are already mapped to modulator pins via a product-specific flash pattern table as described earlier.

Section 10: Peripheral Drivers 10.0 Overview

The microcontroller peripherals are hardware modules for carrying out specific tasks, such as handling USART communications at the physical level. Referring to FIG. 16, and as previously noted, the firmware drivers provide a hardware abstraction layer (HAL) and a standard application programming interface (API) for the application modules to use the peripherals.

A pin pulse width modulator and an I2C bit-bang module (used for the Eaglet port extender IC) are exceptions in that they only manipulate the general-purpose microcontroller I/O pins, and are not based on a specific peripheral or set of peripheral control registers.

10.1 Can Bus

The CAN bus peripheral and driver were explained previously in the application interface modules section (section 4.1).

10.2 Pin Pulse Width Modulator

A pin modulator module serves as a software pulse width modulator (PWM) for a portion of the microprocessor port pins. Each pin is modulated individually and has an associated level. The modulated pins control lights or indicators.

The pin modulator is clocked by the system tick interrupt. On each clock, the state for each modulated pin is calculated and set, and then a PWM counter is incremented. The number of clocks per PWM cycle is product-specific. On the last clock of a PWM cycle, the counter is reset to zero. A modulated pin will be set high if its individual level is greater than the counter, otherwise it is set low. (Inverse PWM, discussed later, acts in the opposite way.)

The pin modulator also pulse-width modulates the pins of a separate port extender IC. Each port extender pin is modulated individually and has an associated level. On each clock, the state of each extended port pin is calculated and then sent as a group via an I2C serial bus to the extender IC.

The pin modulator also initiates the transmission of asynchronous serial commands over a microprocessor USART communication pin. The commands control the rotation of one or more beacon modules. The communication pin and one of the modulated light pins both share a metal rail that conducts control signals. The communication signals are zero to five volts, and the PWM signals are zero to 12 volts.

The pin modulator sends the serial commands on 480 millisecond intervals, during the period when the PWM counter is zero. The communication bit rate is set high enough to allow for the transmission of at least two bytes during that period. Also during that period, the modulated pin that shares the rail is prevented from applying voltage to the rail. Even if the modulated pin's light would have otherwise been on, the missing on-time is infrequent enough and short enough to not normally be noticeable.

While the rail is being pulse-width modulated for a light level, and super-modulated for a light pattern, the beacon serial communication receiving logic may flag an error. Therefore, the serial command is comprised of two bytes. The first byte is always a value of 255 and serves to clear the beacon receiving logic. The second byte is one of three commands: start rotation, synchronize rotation, or stop rotation. After a start command is sent, the synchronize command is sent every 480 milliseconds until the stop command is sent. The stop command is sent every 480 milliseconds for three times to ensure that the command is received.

10.3 Port Pin Configurator

A port pin configurator module configures all of the microcontroller pins on power-up. The pin configurator uses a table to know the pin purpose (general-purpose I/O or peripheral, such as USART), the pin direction (input or output), and the initial pin state. The pin configurator module also provides methods to individually set the pin direction and state.

10.4 USART

A USART module is used to send commands to rotator beacon light bar lights. The system logic module sends beacon commands to the pin pulse width modulator module, which in turn forwards the commands to the beacon, as previously explained.

10.5 EEPROM and I2C

An EEPROM peripheral IC is connected to the microcontroller via an I2C peripheral. An I2C peripheral driver provides an API to the application modules. An EEPROM driver provides an API to the application modules, and uses the I2C API to communicate with the EEPROM IC.

10.6 Port Expander and Bit-Bang I2C

For the Eaglet product, a port expander peripheral IC is connected to the microcontroller via an I2C bit-bang driver. The port expander increases the number of lights that can be controlled by the Eaglet light bar. The I2C bit-bang driver provides continuous updates to the port expander.

The updates are initiated by the pin pulse width modulator as explained previously. The I2C bit-bang outputs the update and does not check for bus timing errors. During normal operation the updates are non-stop and therefore a missed (erroneous) message would probably not be noticeable by the viewer. Due to the continuous nature of the updates, the error-checking I2C peripheral is not suited for this task.

10.7 System Time Base

A system time base module is clocked by the ARM processor core SysTick interrupt at 2 KHz. The time base in turn clocks the pin pulse width modulator. The time base provides a 1 millisecond resolution system time.

An individual software timer is a structure that the application modules use to trigger periodic events. The application modules create instances of the software timers. The time base provides methods to initialize the software timers, and to check them for expiration and then automatically restart them.

The system time base provides a method to pause the program. While the program is paused, the pin modulator is still clocked and a watchdog timer (explained next) is serviced.

10.8 Watchdog

A watchdog peripheral driver provides a watchdog API to the application. If the watchdog timer is not serviced periodically, it invokes a system reset. The main run loop of the application services the watchdog timer each time through the loop. As previously noted, the watchdog is also serviced continuously while the time base method to pause the program is looping.

Section 11: Messaging Example

11.1 Light Pattern Invoked From JBox

In this example, a user activates a light bar pattern from the JBox. The light bar stores three presets that are user-selected pattern indices. The event starts with the user raising the discrete-wire input at the JBox which corresponds to a pattern preset. The voltage on the wire is normally at zero volts and the user raises it to a nominal 12 volts.

In response to the input event, the JBox broadcasts an I/O state message on the CAN bus. The message is comprised of a HazCAN HCTP_STATUS type message that is the payload of an ISO-TP single-frame message which in turn is the CAN packet payload. The JBox status message includes bitfields for the input states, output states, and output control masks.

The 29-bit extended CAN packet address field is used to identify the message type, the sender and the intended recipient. In this example, the recipient address is set to zero signifying a CAN broadcast message. Note that the JBox also sends the I/O state messages once per second, regardless of any JBox input activity.

The light bar microcontroller CAN peripheral receives the JBox message. The message is routed by the light bar CAN firmware module to the light bar JBox interface module. The JBox interface module translates HazCAN bitfield messages to ULC control messages, and vice versa. When a CAN message is received, the interface module filters the message as type HCTP_STATUS, sender JBox, and recipient broadcast. Messages that do not pass the filter are discarded.

Two features are explained here as an aside to example 11.1. First, the interface module keeps a timer to track the presence of the JBox on the CAN bus. If an incoming message passes through the filter, then the timer is reset and the JBox is flagged as present. If the timer expires, then the JBox is flagged as not present on the CAN bus.

Second, for safety purposes, any messages that pass through the filter are examined for the state of the stop, tail, and turn (STT) light channels. Those inputs are always converted into ULC direct light control messages such as ULC_TAIL or ULC_STOP (described previously) and placed in the JBox interface module's receiver queue. In other words, some ULC codes relate to system inputs. System inputs may arrive over the CAN bus or at discrete input port pins (e.g., just generic pins, not communication pins). These inputs are converted to ULC messages by their particular interface module, such as the JBox interface module. The ULCs identify the inputs that are in effect system control codes (ULC_CC_PRESET_1, for example, where the ULC_CC_xxxx form indicates a system control code). System control code messages are consumed by the system logic module, which in turn emits light control code messages. However, in the case of the vehicle stop, tail, and turn signals, the JBox interface module expedites those and converts them directly to light control codes, as opposed to system control codes.

Turning back to the example, the JBox interface module has received the JBox bitfield message. It compares the state of the non-STT inputs to their previously known state. Only inputs whose state has changed are converted into ULC messages and placed in the queue, thus reducing internal message traffic. The message ULC in this example is ULC_CC_PRESET_1, and the value is 1. When the wire is returned to zero volts, a ULC_CC_PRESET_1 message with a value of 0 will be generated.

The interface message queue is a synchronization mechanism. CAN messages may arrive from other devices at any time and are placed in the queue as part of an interrupt service routine. While messages are pulled from the queue, the interrupt service is temporarily disabled. All messages pulled from the JBox interface queue are sent to the light bar message router module.

The message router only routes ULC messages. It uses a routing table to list message recipients based on the sender module type. For incoming JBox interface module messages, the table indicates that the channel map and button controller modules are recipients.

The channel map is on the JBox interface recipient list because it processes light control codes for the stop, tail, and turn (STT) signals. This highlights the distinction in the ULC codes. The JBox interface converts the STT bitfields to light control codes for use by the channel map module, and converts the other bitfields to system control codes ultimately for use by the system logic module.

Continuing on, the router receives the ULC_CC_PRESET_1 message from the JBox interface and forwards it to the button controller module.

The button controller module processes all incoming system control messages. It looks for certain messages in order to add information needed by the system logic module. A message value adjusted to 2 or 3 represents double-pressed or held-pressed, respectively. A new message may be generated when two buttons are held pressed concurrently. Note that a pressed button is analogous to a wire input at 12 volts. In the case of the JBox discrete-wire inputs, there are only two preset inputs, but when they are both pressed the third preset is selected.

The button controller sends both the original and adjusted (e.g., for double-pressed button) messages back to the message router. In the current example, the JBox ULC_CC_PRESET_1 message passes through unaltered. The message router then uses the routing table to determine that only the system logic module is a recipient.

The system logic responds to the event message in several ways. A quad pattern sequencer message is generated to make the light bar lights start flashing. A preset indicator message is generated to turn on the keypad preset button light. A keypad interface module quad pattern timer is started, allowing the quad pattern sequencer messages to flow through to the keypad quad indicator lights for a brief time period. Each of the aforementioned message values indicates the current light level which may be affected by placing the system in nighttime mode. All of the messages are sent to the message router.

The message router table indicates that the quad sequencer, safety director sequencer, keypad indicator sequencer, channel map, JBox interface and keypad interface modules are all recipients of the system logic module ULC messages.

The quad sequencer module (an instantiation of the generic light sequencer module) receives the indexed pattern start message and begins generating light control messages. The messages may be of the individual quadrant light type, or bitfield messages that affect the light level of one or more quadrant lights. The sequencer messages are sent to the router. The router table indicates that the channel map and keypad are recipients of quad sequencer messages. The keypad is a recipient because the quad pattern is briefly shown on the keypad when the pattern is first started.

The channel map module receives the sequencer light control messages. For individual light control messages, the message value is the light level. The channel map uses a table to convert the message ULC to an indexed channel of the microcontroller pin modulator module.

For bitfield light control messages, the channel map extracts the light level from the four most significant bits of the message value. The remaining lower bits correspond to the channel index, where value bit 0 is channel zero, value bit 1 is channel one, and so on. A bit value of 1 indicates that the channel level should be modified.

The interface between the channel map and the processor pin modulator crosses the boundary between application and hardware-specific software modules. The channel map is supplied with a product-specific table to convert universal light codes into light modulation channels. The channel map leaves it to the pin modulator to convert those channels into specific processor port pins.

The pin modulator receives the channel map method calls, which are not ULC messages. The method calls set the modulation value of one or more indexed light channels. The modulation value determines the percentage of on time for the light, and therefore the power. The pin modulator uses a table (the port pin configuration module table) to address the microprocessor port control registers that correspond to the channel indices.

Figure 22:
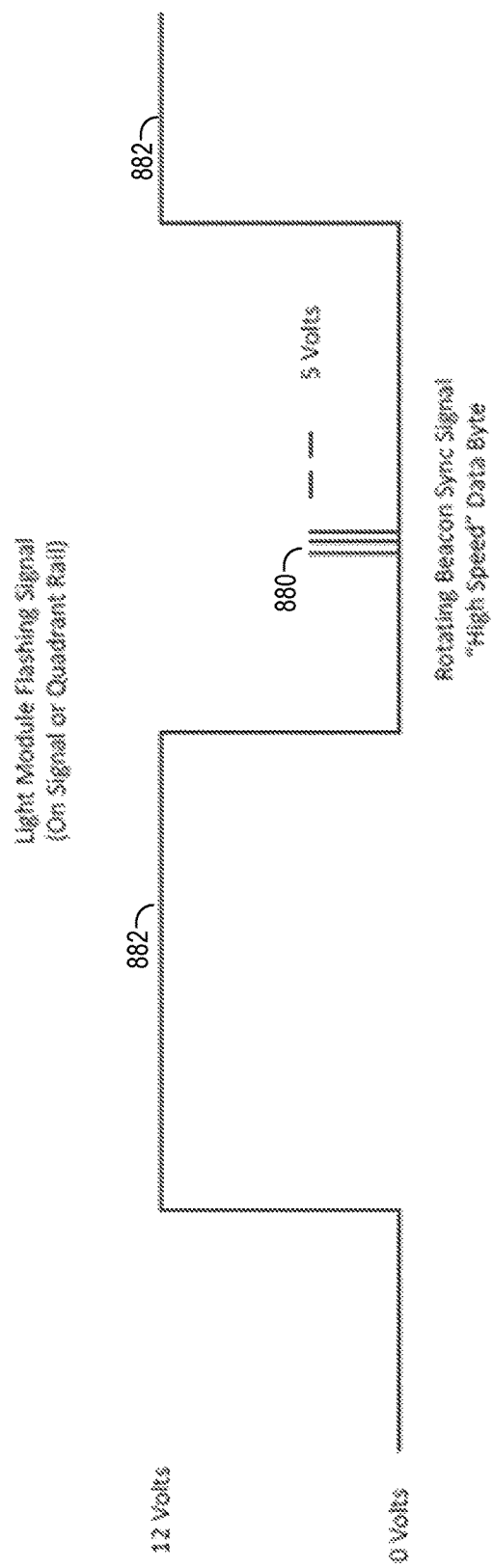
FIG. 22 is a timing diagram showing a lower voltage beacon synchronization signal interleaved between two higher voltage illumination activation pulses.

Each pin of the modulator can run in one of several modes including PWM, inverse PWM, binary and inverse binary. The channel map uses the channel map table to configure the pin modulator for the particular product at power-up. The stop, tail, turn signals, and worklights are binary (i.e., on or off). The quadrant lights are PWM, except for quadrant 3, which, as shown in FIG. 22, is inverse PWM so that beacon synchronization signals 880 can be interleaved between higher-voltage pulses 882. Rotating beacon light module is also responsive to (higher, 12-volt) flash signals, but it also detects lower voltage serial command control signals provided between higher voltage PWM pulses on a same rail as the flash signal so as to start, synchronize, and stop rotation.

Skilled persons will understand that many changes may be made to the details of the above-described embodiments without departing from the underlying principles of the invention. The scope of the present invention should, therefore, be determined only by the following claims.

The invention claimed is:

1. A method of communicating though a controller area network (CAN) bus of a light bar system, the method comprising:
   generating a light code message including first and second portions, the first portion including a metadata code and the second portion including a value, the metadata code defining an operative relationship between the value and a lighting device of the light bar system;
   generating a data field including an ISO-TP single frame header, a message subtype, and the light code message; and
   providing the data field to a CAN controller for including the data field within a CAN message for transmission through the CAN bus.

2. The method of claim 1, further comprising generating the light code message by selecting for the first portion a light code from a set of predefined light codes.

3. The method of claim 1, in which the metadata code indicates that the value of the second portion is a brightness level of the lighting device.

4. The method of claim 1, in which the metadata code is a command to change a state of the lighting device according to the value of the second portion.

5. The method of claim 4, in which the command identifies a flash pattern for the lighting device and the value of the second portion indicates a brightness level for the flash pattern.

6. The method of claim 1, further comprising:
   detecting a user input applied to a user input device; and
   in response to detecting the user input, providing as the value of the second portion a scalar value representing the user input.

7. The method of claim 6, in which a keypad or JBox includes the user input device.

8. The method of claim 6, in which user input is a button press, the method further comprising indicating a state of a button press with the scalar value.

9. The method of claim 1, in which lighting device is a backlight LED, and the value of the second portion is a scalar value that indicates a desired brightness level of the backlight LED.

10. The method of claim 1, in which lighting device is a light bar light module, and the value of the second portion is a scalar value that indicates a command to switch an illumination state of the light bar light module.

11. The method of claim 1, in which the value of the second portion is a bitfield value.

12. The method of claim 1, further comprising:
detecting a user input applied to a user input device; and
in response to detecting the user input, providing as the value of the second portion a bitfield value representing the user input.

13. The method of claim 1, in which the first portion is a 16-bit portion of the light code message.

14. The method of claim 1, in which the second portion is a 32-bit portion of the light code message.

15. The method of claim 1, further comprising generating an address field having an extended frame format.

16. The method of claim 1, further comprising generating an address field having a 5-bit message type, a 12-bit sender address, and a 12-bit receiver address.

17. The method of claim 16, further comprising generating the 5-bit message type as having a hexadecimal value representing a command message.

18. The method of claim 17, in which the hexadecimal value is 0x10.

19. The method of claim 1, further comprising generating the data field by encapsulating the light code message with the ISO-TP single frame header and the message subtype.

20. The method of claim 1, in which the message subtype has a hexadecimal value of 0x20.

21. An apparatus of a controller area network (CAN) node for communicating though a CAN bus of a light bar system, the apparatus comprising:
a non-transient machine-readable storage device configured to store machine-readable instructions; and
a processor configured to execute the machine-readable instructions to:
generate a light code message including first and second portions, the first portion including a metadata code and the second portion including a value, the metadata code defining an operative relationship between the value and a lighting device of the light bar system;
generate data field including an ISO-TP single frame header, a message subtype, and the light code message; and
provide the data field to a CAN controller for including the data field within a CAN message for transmission through the CAN bus.

22. The apparatus of claim 21, in which the CAN node comprises one of a JBox, light bar, keypad, safety director, or peripheral computer.

23. The apparatus of claim 21, in which the CAN node is first CAN node comprising a keypad communicatively coupled to a second CAN node comprising a light bar.

24. The apparatus of claim 23, in which the metadata code indicates that the value of the second portion is a command to cause the light bar to change a set of available flash patterns from a first set to a second set that is different from the first set.

25. The apparatus of claim 24, in which all members of the first set are UNECE R65 compliant patterns and which at least some members of the second set are not UNECE R65 compliant patterns.

\* \* \* \* \*